US012103320B2

(12) United States Patent
Sakurada et al.

(10) Patent No.: US 12,103,320 B2
(45) Date of Patent: Oct. 1, 2024

(54) LIQUID EJECTING DEVICE AND METHOD FOR ADJUSTING LIQUID EJECTING DEVICE

(71) Applicant: SEIKO EPSON CORPORATION, Tokyo (JP)

(72) Inventors: Kazuaki Sakurada, Nagano (JP); Junichi Takenuki, Sapporo Shiroishi-ku (JP); Teruyuki Takata, Yamagata-mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/476,532

(22) Filed: Sep. 16, 2021

(65) Prior Publication Data

US 2022/0088952 A1 Mar. 24, 2022

(30) Foreign Application Priority Data

Sep. 18, 2020 (JP) ................................ 2020-157105

(51) Int. Cl.
*B41J 29/393* (2006.01)
*B41J 2/21* (2006.01)

(52) U.S. Cl.
CPC ........... *B41J 29/393* (2013.01); *B41J 2/2142* (2013.01); *B41J 2/2146* (2013.01); *B41J 2029/3935* (2013.01)

(58) Field of Classification Search
CPC .............. B41J 2029/3935; B41J 29/393; B41J 2/2132; B41J 2/2142; B41J 2/2146; B41J 2/2135; B41J 2/04505
See application file for complete search history.

(56) References Cited

U.S. PATENT DOCUMENTS

| | | | |
|---|---|---|---|
| 9,738,088 | B2 | 8/2017 | Narumi et al. |
| 10,399,372 | B2 | 9/2019 | Kanai |
| 10,737,486 | B2 | 8/2020 | Sakurada |
| 10,960,695 | B2 | 3/2021 | Murayama et al. |
| 11,590,784 | B2 | 2/2023 | Murayama et al. |
| 2004/0223032 | A1 | 11/2004 | Akase |
| 2016/0347051 | A1 | 12/2016 | Narumi et al. |

(Continued)

FOREIGN PATENT DOCUMENTS

| | | | |
|---|---|---|---|
| JP | 2012-166385 | A | 9/2012 |
| JP | 2016-221833 | A | 12/2016 |

(Continued)

*Primary Examiner* — Jannelle M Lebron
(74) *Attorney, Agent, or Firm* — Global IP Counselors, LLP

(57) ABSTRACT

A liquid ejecting device includes: a head having a plurality of nozzles for ejecting droplets onto a printing medium; a movement unit configured to move the head relative to the printing medium in a relative movement direction; and a control unit configured to record a test pattern on the printing medium by controlling the head and the movement unit, and to perform recording by correcting control of the head and/or the movement unit based on a correction value obtained from the test pattern, wherein the test pattern includes a plurality of patches from which a plurality of candidates for the correction value for correcting a landing position at which the droplet lands on the printing medium in the relative movement direction are obtained.

20 Claims, 23 Drawing Sheets

(56) References Cited

U.S. PATENT DOCUMENTS

| | | | |
|---|---|---|---|
| 2018/0141359 A1 | 5/2018 | Kawarada et al. | |
| 2018/0236799 A1 | 8/2018 | Kanai | |
| 2020/0047530 A1 | 2/2020 | Murayama et al. | |
| 2020/0230951 A1 | 7/2020 | Kobayashi | |
| 2020/0247162 A1* | 8/2020 | Henmi | B41J 2/2135 |
| 2021/0178790 A1 | 6/2021 | Murayama et al. | |

FOREIGN PATENT DOCUMENTS

| | | |
|---|---|---|
| JP | 2018-134778 A | 8/2018 |
| JP | 2020-023111 A | 2/2020 |
| JP | 2020-111037 A | 7/2020 |
| JP | 2020-138483 A | 9/2020 |

* cited by examiner

| SYMBOL | PRINING DIRECTION | WG | Nozzle Rows |
|---|---|---|---|
| a | +X | 1 | A |
| b | +X | 1 | SA |
| c | −X | 2 | A |
| d | −X | 1 | A |
| e | +X | 2 | A |
| f | −X | 2 | B |
| g | −X | 1 | B |
| h | −X | 1 | B |
| i | +X | 2 | B |

FIG. 12

| | | | | |
|---|---|---|---|---|
| a | a | a | a | a |
| b | b | b | b | b |
| c | f | c | f | c |
| d | g | d | g | d |
| a | h | a | h | a |
| e | i | e | i | e |
| f | c | f | c | f |
| g | d | g | d | g |
| h | a | h | a | h |
| i | e | i | e | i |
| h | h | h | h | h |
| a | a | a | a | a |

FIG. 13

LIQUID EJECTING DEVICE AND METHOD FOR ADJUSTING LIQUID EJECTING DEVICE

The present application is based on, and claims priority from JP Application Serial Number 2020-157105, filed Sep. 18, 2020, the disclosure of which is hereby incorporated by reference herein in its entirety.

BACKGROUND

1. Technical Field

The present disclosure relates to a liquid ejecting device and a method for adjusting the liquid ejecting device.

2. Related Art

In the related art, as an example of a liquid ejecting device, there has been known an inkjet printer that prints a full color image by ejecting a plurality of chromatic inks and a black ink in the form of ink droplets.

JP-A-2020-111037 discloses a technique for correcting deviations of landing positions of droplets ejected by such a liquid ejecting device. Specifically, in the liquid ejecting device disclosed in JP-A-2020-111037, an ejection velocity test pattern for obtaining an ejection velocity of a liquid ejected from an ejecting unit in the form of a droplet is formed, and an ejection timing of a liquid is corrected based on an ejection velocity parameter relating to the ejection velocity of the liquid detected from the ejection velocity test pattern.

However, the method for correcting a deviation of a landing position of a droplet disclosed in JP-A-2020-111037 has a drawback that, when a deviation exists in a specification in forming an ejection velocity test pattern for deriving a correction amount, there may be a case where an appropriate correction cannot be performed. Specifically, for example, the method has a drawback that, when a test pattern is formed by a liquid ejected from a particular nozzle that has an individual difference or when flatness of a surface of a medium on which a test pattern is formed has a deviation, and the like, an appropriate test pattern cannot be obtained and hence, the appropriate correction cannot be performed.

SUMMARY

A liquid ejecting device according to the present disclosure includes: a head having a plurality of nozzles for ejecting droplets onto a recording medium, a movement unit configured to move the head relative to the recording medium in a relative movement direction, and a control unit configured to record a test pattern on the recording medium by controlling the head and the movement unit, and configured to perform recording by correcting control of the head and/or the movement unit based on a correction value obtained from the test pattern, wherein the test pattern includes a plurality of patches for obtaining a plurality of candidates for the correction value for correcting a landing position at which the droplet is landed on the recording medium in the relative movement direction.

A method for adjusting a liquid ejecting device according to the present disclosure is a method for adjusting a liquid ejecting device that includes a head having a plurality of nozzles for ejecting droplets onto a recording medium, and a movement unit configured to move the head relative to the recording medium in a relative movement direction. The method includes: a test pattern recording step for recording a test pattern having a plurality of patches for obtaining a plurality of candidates for a correction value for correcting a landing position at which the droplet is landed on the recording medium in the relative movement direction in the recording medium by controlling the head and the movement unit, a correction value candidate deriving step for deriving the plurality of candidates for the correction value from the test pattern, and a correction value determining step for determining the correction value by statistically processing the plurality of derived candidates for the correction value.

BRIEF DESCRIPTION OF THE DRAWINGS

FIG. 12 is a table showing the printing specifications of the respective images in the patch.

FIG. 13 is a map diagram of the printing specifications for explaining information of landing positions of ink droplets obtained from the test pattern.

DESCRIPTION OF EXEMPLARY EMBODIMENTS

1. First Embodiment

Figure 1:
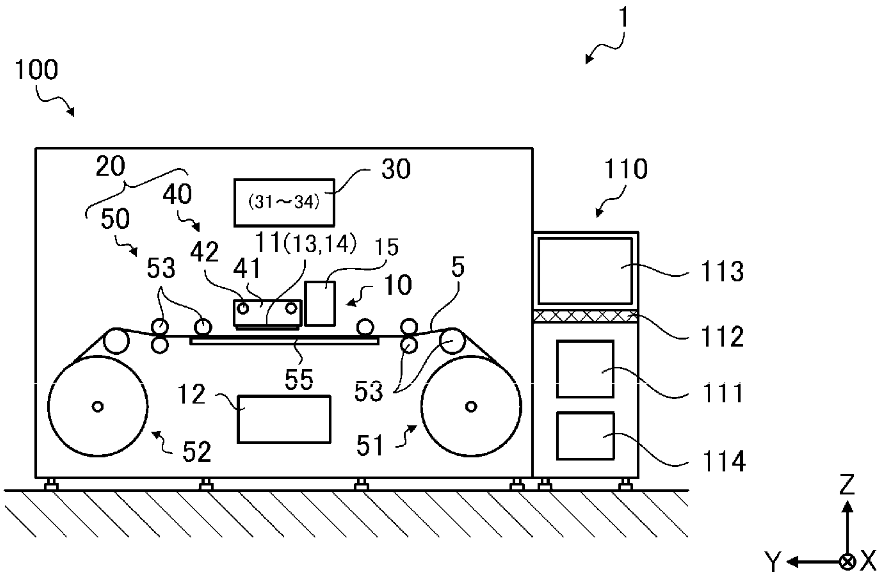
FIG. 1 is a front view illustrating a configuration of a printing apparatus that forms a liquid ejecting device according to a first embodiment.
Figure 2:
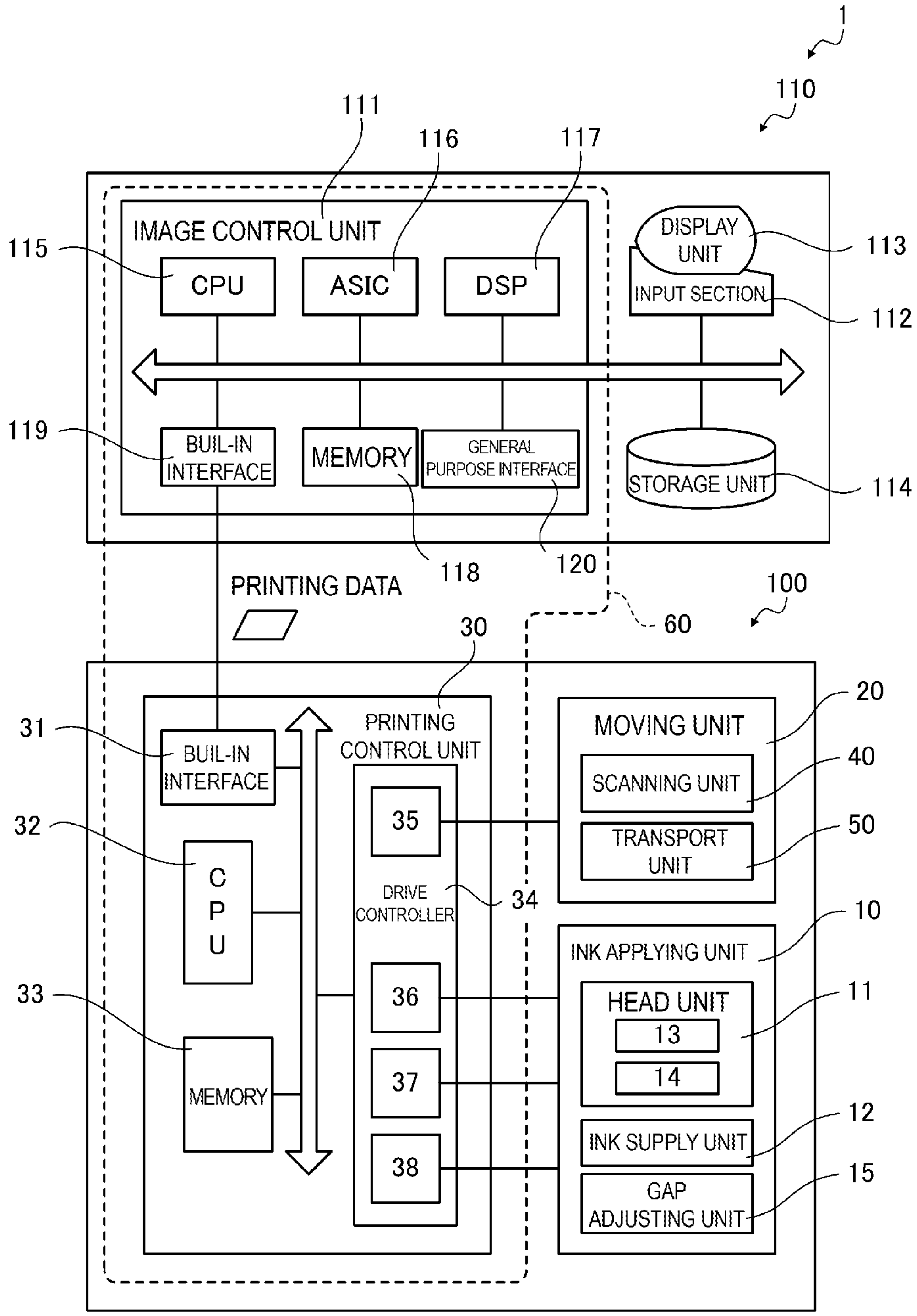
FIG. 2 is a block diagram illustrating the configuration of the printing apparatus that forms the liquid ejecting device according to the first embodiment.

A configuration of a printing apparatus 1 that forms a liquid ejecting device according to the present embodiment is described with reference to FIG. 1 and FIG. 2.

In coordinates given in the drawings, a Z axis direction is assumed as a vertical direction, a +Z direction is assumed as an upward direction, an X axis direction is assumed as a longitudinal direction, a −X direction is assumed as a frontward direction, a Y axis direction is assumed as a lateral direction, a +Y direction is assumed as a leftward direction, and an X-Y plane is assumed as a horizontal plane.

In the present embodiment, the description is made with respect to printing of images, characters, symbols or the like according to one form of "recording". The "recording" includes, besides printing of images, characters, symbols or the like, recording of digital information performed by applying droplets to a recording medium at desired positions, applying of a constituent material or a shaping material of a product, and the like.

The printing apparatus 1 includes a printing unit 100, and an image processing unit 110 coupled to the printing unit 100.

The printing unit 100 is an inkjet serial printer that prints a desired image on an elongated printing medium 5 that is set as a recording medium in a state where the printing medium 5 is wound in a roll shape by applying an ink in the form of liquid to the printing medium 5 based on printing data received from the image processing unit 110.

The image processing unit 110 includes an image control unit 111, an input unit 112, a display unit 113, a storage unit 114, and the like, and controls a printing job for allowing the printing unit 100 to perform printing. The image processing unit 110 generates printing data for allowing the printing unit 100 to perform printing of a desired image based on image data. As a preferred example, the image processing unit 110 is formed using a personal computer.

Software operated by the image processing unit 110 includes a general image processing application software that deals with image data to be printed, a printer driver software that generates printing data for controlling the printing unit 100 and for allowing the printing unit 100 to perform printing, and a color conversion lookup table generation program that generates color conversion lookup table necessary for generation of printing data. In the description made hereinafter, the image processing application software is simply referred to as an image processing application, and the printer driver software is simply referred to as a printer driver.

In the present embodiment, the image data is code information such as bar codes, and digital image information of RGB including line drawing and text data.

The image control unit 111 includes a CPU 115, an ASIC116, a DSP117, a memory 118, a built-in interface 119, a general purpose interface 120, and the like, and performs centralized management of the entire printing apparatus 1. The CPU is an abbreviation for Central Processing Unit, the ASIC is an abbreviation for Application Specific Integrated Circuit, and the DSP is an abbreviation for Digital Signal Processor. The input unit 112 is an information input means serving as a user interface. Specifically, the input unit 112 is, for example, a keyboard, a mouse pointer, and the like.

The display unit 113 is an information display means serving as the user interface, and displays information inputted from the input unit 112, images to be printed in the printing unit 100, and information of a printing job and the like under the control of the image control unit 111.

The storage unit 114 is a rewritable storage medium such as a hard disk drive or a memory card, and stores programs run by the image control unit 111 as the software operated by the image processing unit 110, images to be printed, information of a printing job, and the like.

The memory 118 is a storage medium that secures a region for storing programs run by the CPU 115, a work region in which such programs run, and the like, and includes storage elements such as a RAM and an EEPROM. The RAM is an abbreviation for Random Access Memory, the EEPROM is an abbreviation for Electrically Erasable Programmable Read-Only Memory.

The general purpose interface 120 is an interface to which an external electronic apparatus can be coupled, such as a LAN interface or a USB interface, for example. The LAN is an abbreviation for Local Area Network, and the USB is an abbreviation for Universal Serial Bus.

The printing unit 100 includes an ink applying unit 10, a movement unit 20, a printing control unit 30 and the like. The printing unit 100 that has received printing data from the image processing unit 110 controls the ink applying unit 10 and the movement unit 20 by the printing control unit 30 based on the printing data, and prints an image on the printing medium 5.

The printing data is data for forming images obtained by converting image data such that the printing unit 100 can print images using the image processing application and the printer driver included in the image processing unit 110, and the printing data includes a command for controlling the printing unit 100.

The ink applying unit 10 includes a head unit 11, an ink supply unit 12, a gap adjusting unit 15, and the like.

The movement unit 20 includes a scanning unit 40, a transporting unit 50, and the like.

The scanning unit 40 includes a carriage 41, a guide shaft 42, a carriage motor, and the like. The illustration of the carriage motor is omitted from the drawing.

The transporting unit 50 includes a supply portion 51, a storage portion 52, transport rollers 53, a platen 55, and the like.

The head unit 11 includes a head 13 including a plurality of nozzles 131 that eject printing inks in the form of ink droplets, and a head control unit 14. The head unit 11 is mounted on the carriage 41. That is, the head 13 is mounted on the carriage 41, and moves in a reciprocating manner in the X axis direction as a scanning direction along with the carriage 41 that moves in the X axis direction.

As inks, a set of inks of eight colors consisting of cyan C, magenta M, yellow Y, light cyan LC, light magenta LM, light yellow LY, light black LK, and black K is used as a preferred example.

The ink supply unit 12 includes ink tanks, an ink supply paths through which inks are supplied from the ink tanks to the head 13, and the like. The Illustration of the ink tanks and the ink supply paths are omitted from the drawing.

Figure 3:
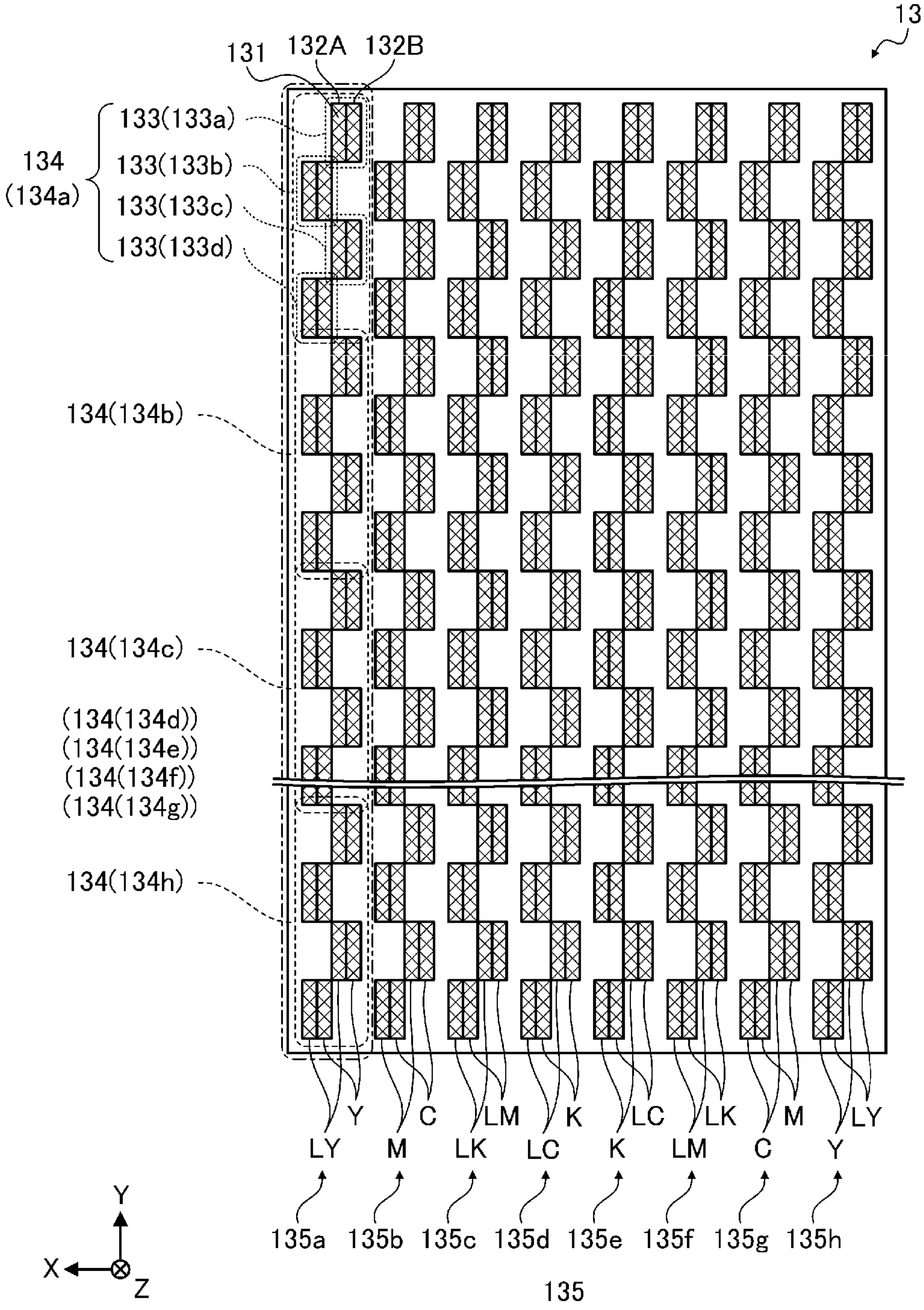
FIG. 3 is a schematic view illustrating an example of an arrangement of nozzle rows as viewed from a lower surface of a head.

As illustrated in FIG. 3, the head 13 is constituted of eight head units 135, that is, the head units 135*a* to 135*h* arranged in the X axis direction.

Each head unit 135 is constituted of eight individual heads 134, that is, the individual heads 134*a* to 134*h* arranged in the Y axis direction.

Each individual head 134 is constituted of four nozzle tips 133, that is, the nozzle tips 133*a* to 133*d*. The nozzle tips 133*a* to 133*d* are arranged in a direction from a +Y side toward a −Y side such that the nozzle tips 133*a* to 133*d* are disposed in an alternately staggered manner in the X axis direction. The nozzle tip 133*a* and the nozzle tip 133*c* are arranged on a −X side with respect to the nozzle tip 133*b* and the nozzle tip 133*d*.

Each nozzle tip 133 is constituted of a nozzle row 132A and a nozzle row 132B arranged adjacent to each other in the X axis direction. The nozzle row 132A is arranged on a +X side of the nozzle row 132B.

400 nozzles 131 are arranged in each nozzle row 132A and each nozzle row 132B along the Y axis direction as a nozzle row direction.

When each head unit 135 is viewed in the X axis direction, the respective nozzles 131 are aligned at a predetermined interval over the whole Y axis direction, and are formed so as to eject inks supplied to the respective nozzle rows 132 in the −Z direction.

Each nozzle tip 133 is manufactured by a MEMS manufacturing process to which a semiconductor process is applied using a silicon wafer as a basic material, for example. The nozzles 131 that each nozzle tip 131 includes form a nozzle group where the nozzles 131 have the same or similar ink ejection characteristics. In the present embodiment, the MEMS is an abbreviation for Micro Electro Mechanical Systems.

A light yellow LY ink is supplied to the nozzle rows 132A included in the head unit 135*a* and the nozzle rows 132B included in the head unit 135*h*.

A yellow Y ink is supplied to the nozzle rows 132B included in the head unit 135*a* and the nozzle rows 132A included in the head unit 135*h*.

A magenta M ink is supplied to the nozzle rows 132A included in the head unit 135*b* and the nozzle rows 132B included in the head unit 135*g*.

A cyan C ink is supplied to the nozzle rows 132B included in the head unit 135*b* and the nozzle rows 132A included in the head unit 135*g*.

A light black LK ink is supplied to the nozzle rows 132A of the head unit 135*c* and the nozzle rows 132B included in the head unit 135*f*.

A light magenta LM ink is supplied to the nozzle rows 132B included in the head unit 135*c* and the nozzle rows 132A included in the head unit 135*f*.

A light cyan LC ink is supplied to the nozzle rows 132A included in the head unit 135*d* and the nozzle rows 132B included in the head unit 135*e*.

A black K ink is supplied to the nozzle rows 132B included in the head unit 135*d* and the nozzle rows 132A included in the head unit 135*e*.

The ink tanks, the ink supply paths, and ink supply paths to the nozzles 131 that eject the same ink are provided independently for respective inks.

The gap adjusting unit 15 is configured to change, corresponding to a thickness of the printing medium 5, a distance between a lower surface of the head 13, that is, a nozzle surface where the nozzle 131 opens and an upper surface of a platen 55 that supports the printing medium 5. The gap adjusting unit 15 includes a support mechanism that is configured to change a support position of the guide shaft 42 or a support position of the platen 55 in the Z axis direction based on the control of the printing control unit 30. The illustration and the specific description of the support mechanism are omitted.

The movement unit 20, that is, the scanning unit 40 and the transporting unit 50 are configured to move the printing medium 5 relative to the head 13 under the control of the printing control unit 30.

The guide shaft 42 extends in the X axis direction and supports the carriage 41 in a slidable manner. The carriage motor forms a driving source in moving the carriage 41 along the guide shaft 42 in a reciprocating manner. That is, the scanning unit 40 is configured to move the carriage 41, that is, the head 13 in the X axis direction along the guide shaft 42 under the control of the printing control unit 30. That is, the movement unit 20 is configured to move the head 13 and the printing medium 5 relative to each other in the first direction in the X axis direction that intersects with the Y axis direction that is the nozzle row direction and in the second direction that is a direction opposite to the first direction. The head unit 13 that is included in the head unit 11 mounted on the carriage 41 ejects ink droplets onto the printing medium 5 supported by the platen 55 under the control of the printing control unit 30 while moving in the X axis direction thus forming a plurality of dot rows along the X axis direction on the printing medium 5.

In the present embodiment, the image control unit 111 and the printing control unit 30 form the control unit 60 that controls the head 13 and the movement unit 20 and performs printing based on the image data.

The supply unit 51 rotatably supports a reel on which the printing medium 5 is wounded into a roll, and the supply unit 51 feeds the printing medium 5 into the conveying path. The housing unit 52 rotatably supports a reel, on which the printing medium 5 is wound, and reels off the printing medium 5, on which printing is completed, from the conveying path.

The transport rollers 53 are formed of driving rollers that move the printing medium 5, driven rollers that are rotated along with the movement of the printing medium 5, and the like. The transport rollers 53 move the printing medium 5 on the upper surface of the platen 55 in the Y axis direction that is a transport direction that intersects with a scanning direction. The transport rollers 53 form a transport path where the printing medium 5 is transported to a housing unit 52 from the supply unit 51 through a printing area of the ink applying unit 10. The printing area is an area where the head 13 moves on the upper surface of the platen 55 in the X axis direction.

The platen 55 is a flat plate that extends in the X-Y plane direction and supports the printing medium 5 from a lower surface of the printing medium 5 in the printing area.

The printing control unit 30 includes a built-in interface 31, a CPU 32, a memory 33, a drive control unit 34, and the like, and controls the printing unit 100.

The built-in interface 31 is connected to the built-in interface 119 of the image processing unit 110, and performs transmitting and receiving of data between the image processing unit 110 and the printing unit 100.

The CPU 32 is an arithmetic processing unit for controlling the entire printing unit 100.

The memory 33 is a storage medium that secures a region for storing programs run by the CPU 32, a work region in which such programs run, and the like, and includes storage elements such as a RAM and an EEPROM.

The CPU 32 controls the ink applying unit 10 and the movement unit 20 via the drive control unit 34 in accordance with the program stored in the memory 33 and the printing data received from the image processing unit 110.

The drive control unit 34 includes a firmware that operates based on the control of the CPU 32, and controls driving of the head unit 11, the ink supply unit 12, the gap adjustment unit 15 of the ink applying unit 10, and the scanning unit 40 and the transporting unit 50 of the movement unit 20.

The drive control unit 34 includes drive control circuits that include a movement control signal generating circuit 35, an ejection control signal generating circuit 36, a drive signal generating circuit 37, a gap control circuit 38, and the like, and a ROM or a flash memory that incorporates a firmware for controlling these drive control circuits. The illustration of the ROM or the flash memory that incorporates the firmware for controlling the drive control circuits is omitted from the drawings. In the present embodiment, the ROM is an abbreviation for Read-Only Memory.

The movement control signal generating circuit 35 is a circuit that generates a signal for controlling the scanning unit 40 and the transporting unit 50 of the movement unit 20 in accordance with an instruction from the CPU 32 based on the printing data.

The ejection control signal generating circuit 36 is a circuit that generates head control signals for selecting the nozzles 131 that eject inks, for selecting ejection amounts of inks, for controlling ejection timings of inks, and the like in accordance with instructions from the CPU 32 based on the printing data.

The drive signal generating circuit 37 is a circuit that generates drive signals for driving pressure generating chambers included in the head 13.

The gap control circuit 38 is a circuit that drives and controls a support mechanism included in the gap adjusting unit 15, that is, a support mechanism capable of changing a support position of the guide shaft 42 or a support position of the platen 55 in the Z axis direction.

According to the configuration described above, the printing control unit 30 prints a desired image on the printing medium 5 by repeating an operation of ejecting ink droplets to the printing medium 5 that is supplied to the printing area by the supply unit 51 and the transport rollers 53 from the head 13 while moving the carriage 41 that supports the head 13 along the guide shaft 42 in the X axis direction, and an operation of moving the printing medium 5 in the +Y direction that intersects with the X axis direction by the transport rollers 53.

The landing positions at which ink droplets ejected from the nozzles 131 land on the printing medium 5, that is, the positions at which dots are formed by the ink droplets are changed corresponding to a timing at which the head 13 ejects ink droplets; the positions of the nozzles that eject ink droplets, a relative moving speed between the head 13 and the printing medium 5, an ejection velocity of ink droplets, a distance from the head 13 to the printing medium 5, a direction that ink droplets are ejected, a transport accuracy of the printing medium 5, and the like. The more the landing positions of ink droplets become irregular so that the more the landing positions deviate from the predetermined landing positions, the larger the degradation of the printing quality becomes. Accordingly, in a case where the irregularities in the landing position are estimated in advance, by grasping a state of the irregularities, for example, it is possible to make the landing positions closer to the predetermined landing positions by correcting timings of ejecting the ink droplets or a relative movement amount between the head 13 and the printing medium 5 and hence, the degradation of the print quality can be suppressed.

With reference to FIG. 4 to FIG. 8, factors that cause the deviation of the landing position at which an ink droplet ejected from the nozzle 131 lands on the printing medium 5 are described in detail.

In the following description, an ejection velocity of the ink droplet that the nozzle 131 ejects in the −Z direction is assumed as Vm0, a moving speed of the head 13, that is, a relative moving speed of the nozzle 131 with respect to the printing medium 5 in the X axis direction is assumed as Vcr, a flying speed of the ink droplet is assumed as Vm1, and a workpiece gap that is a distance from a distal end of the nozzle 131 to the printing medium 5 is assumed as WG1, WG2. The WG1, WG2 are two workpiece gaps that can be set, or two actual workpiece gaps with respect to a set workpiece gap WG, wherein the relationship of ΔWG=WG2−WG1>0 is satisfied.

Figure 4:
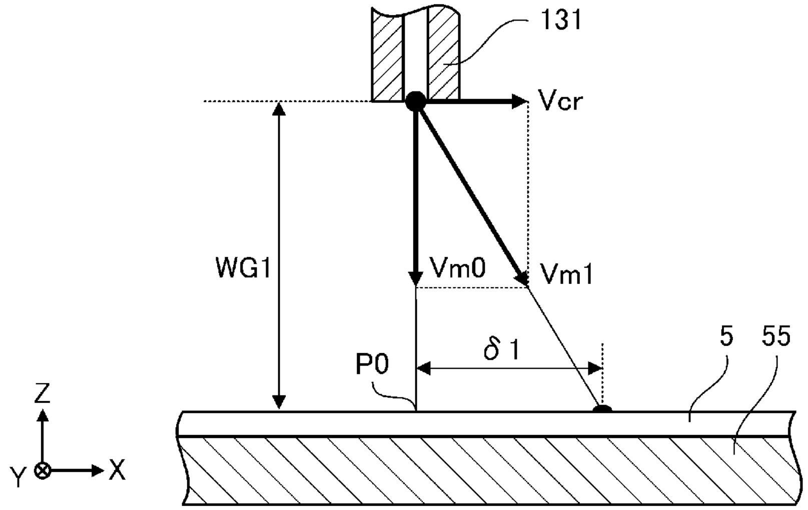
FIG. 4 is a conceptual view for explaining factors that cause a deviation of a landing position at which an ink droplet lands on a printing medium.

As illustrated in FIG. 4, a deviation amount δ1 from an ejection position P0 of an ink droplet to a landing position in the X axis direction is obtained by the following equation.

$$\delta 1 = WG1/Vm0 \times Vcr$$

Accordingly, also in a case where irregularity exists in the ejection velocity Vm0 of the ink droplet, the moving speed Vcr of the head 13 or the workpiece gap WG1, the deviation amount δ1 changes.

Figure 5:
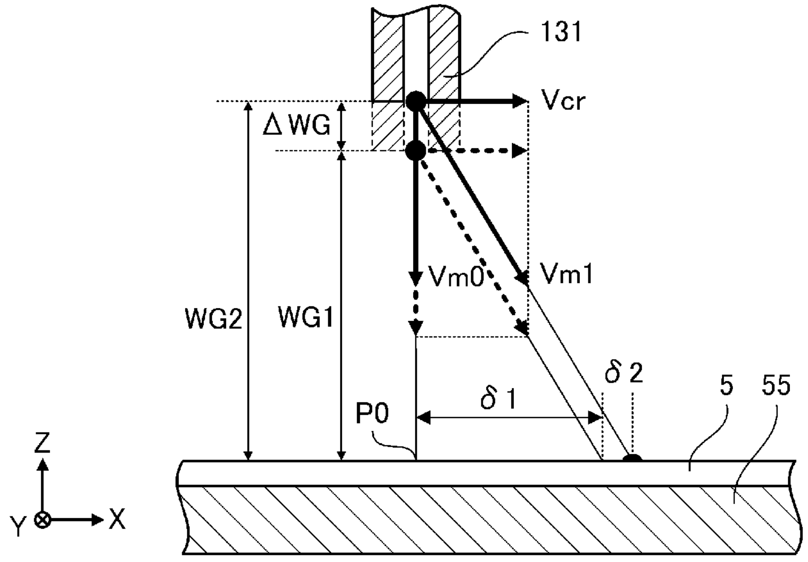
FIG. 5 is a conceptual view for explaining factors that cause a deviation of a landing position at which an ink droplet lands on a printing medium.

As illustrated in FIG. 5, a deviation amount δ2 of a landing position with respect to the deviation amount δ1 when the workpiece gap changes from WG1 to WG2 is obtained by the following equation.

$$\delta 2 = WG2/Vm0 \times Vcr - WG1/Vm0 \times Vcr = \Delta WG/Vm0 \times Vcr$$

For example, in a case where an actual workpiece gap is WG2 with respect to a set value WG1 of the workpiece gap, such a difference can be regarded as an amount of irregularity in workpiece gap, and the deviation amount δ2 becomes a deviation amount of the landing position caused by the irregularity AWG.

Figure 6:
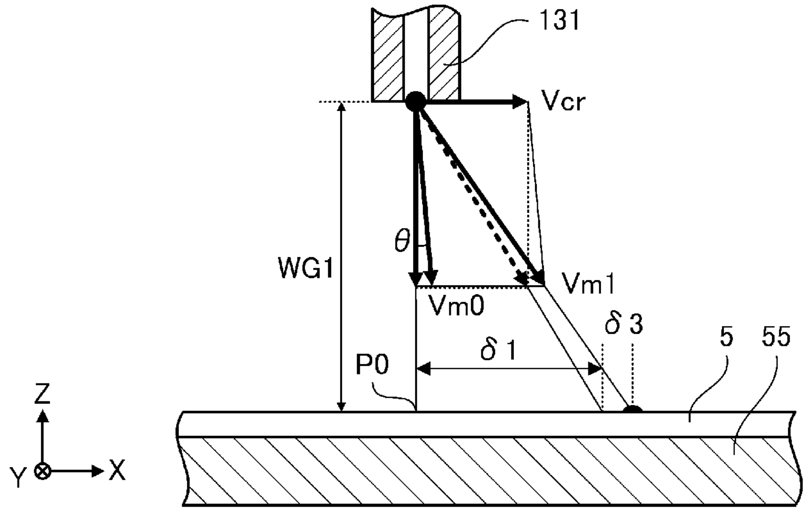
FIG. 6 is a conceptual view for explaining factors that cause a deviation of a landing position at which an ink droplet lands on a printing medium.

As illustrated in FIG. 6, a deviation amount δ3 of the landing position with respect to the deviation amount δ1 in a case where an ejection angle of the ink droplet is deviated by an angle θ in the +X direction can be approximated by the following equation.

$$\delta 3 = WG1 \times \tan\theta$$

For example, the deviation in ejection angle is generated by the irregularity in a mounting angle of the individual head 134 or the head unit 135, the irregularity in forming accuracy of the nozzle tip 133 or the like.

Figure 7:
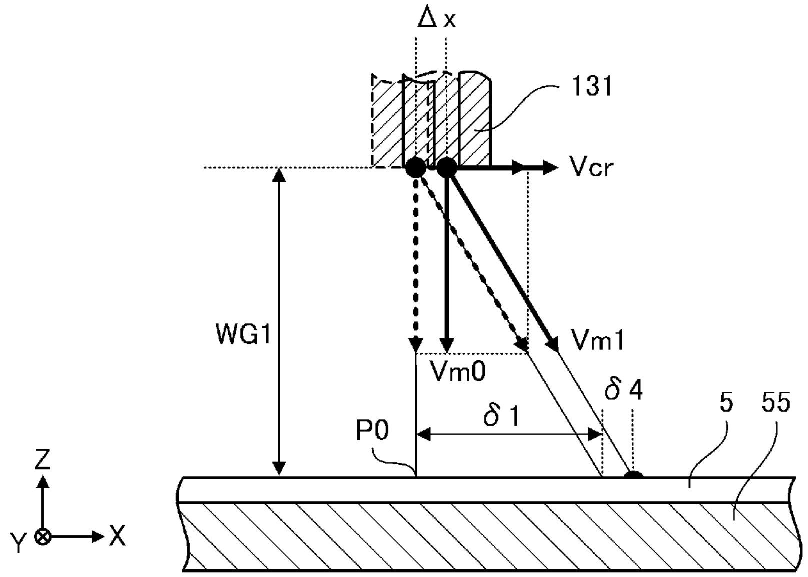
FIG. 7 is a conceptual view for explaining factors that cause a deviation of a landing position at which an ink droplet lands on a printing medium.

As illustrated in FIG. 7, a deviation amount δ4 of the landing position with respect to the deviation amount δ1 in a case where a mounting position of the nozzle 131 is deviated by Δx in the +X direction is obtained by the following equation.

$$\delta 4=\Delta x$$

In a case where actually observed deviation amounts δ1 to δ4 differ from expected values of the above-mentioned respective deviation amounts δ1 to δ4, that is, from designed values of the deviation amounts δ1 to δ4 determined under the set conditions, for example, it is possible to make the landing position closer to the predetermined landing position by correcting a timing of ejecting an ink droplet. For example, the correction of the timing of ejecting an ink droplet can be performed by correcting a timing of rising or falling of a waveform of a drive signal generated by the drive signal generating circuit 37.

A landing position deviated in the Y axis direction that differs from the deviation direction of the deviation amounts δ1 to δ4, that is, in the transport direction of the printing medium 5 can be made closer to a predetermined landing position by correcting a transport amount of the printing medium 5 using the transporting unit 50.

The printing apparatus 1 according to the present embodiment is configured to perform printing by printing a test pattern for observing landing positions of ink droplets on the printing medium 5, and by correcting control of the head 13 and/or the movement unit 20 based on information obtained by analyzing the test pattern.

Figure 8:
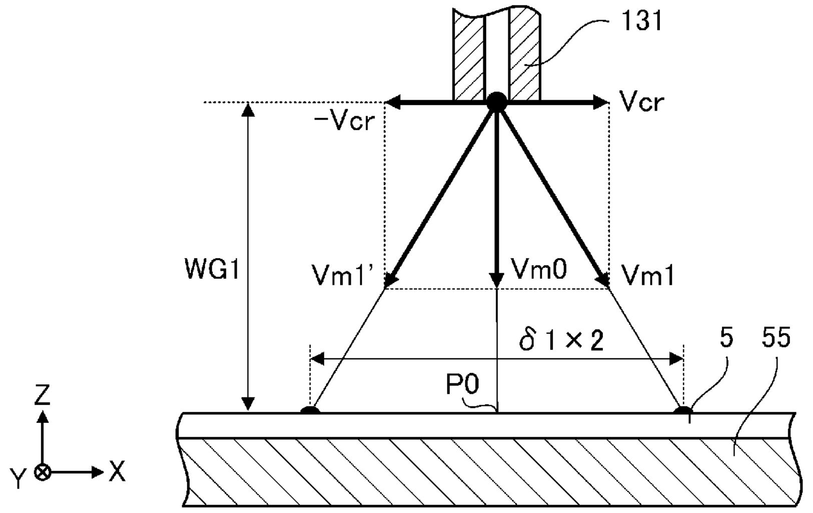
FIG. 8 is a conceptual view for explaining factors that cause a deviation of a landing position at which an ink droplet lands on a printing medium.

In performing printing the test pattern using the above-mentioned printing method, that is, in performing the printing by ejecting ink droplets while moving the head 13 in the scanning direction, it is difficult to record an ejection position P0 of an ink droplet in the X axis direction that is a starting point of the deviation amounts δ1 to δ4 to the printing medium 5. Accordingly, as illustrated in FIG. 8, the ejection position P0 can be obtained as an intermediate position between a landing position of an ink droplet when the ink droplet is ejected at the ejection position P0 in a forward path during scanning movement of the head 13, that is, during the movement of the head 13 in the +X direction and a landing position of an ink droplet when the ink droplet is ejected at the ejection position P0 in a backward path during the scanning movement of the head 13, that is, during the movement of the head 13 in the −X direction. The deviation amount δ1 can be obtained as a value that is one-half of a distance between these landing positions. The landing position P0 and the deviation amount δ1 obtained as described above are obtained on the premise that a moving speed Vcr of the head 13 on the forward path and the moving speed Vcr of the head 13 on the backward path are equal to each other, and the ejection direction of the ink droplet is not inclined with respect to the −Z direction.

A test pattern Tp in the present embodiment is described with reference to FIG. 9 to FIG. 12.

Figure 9:
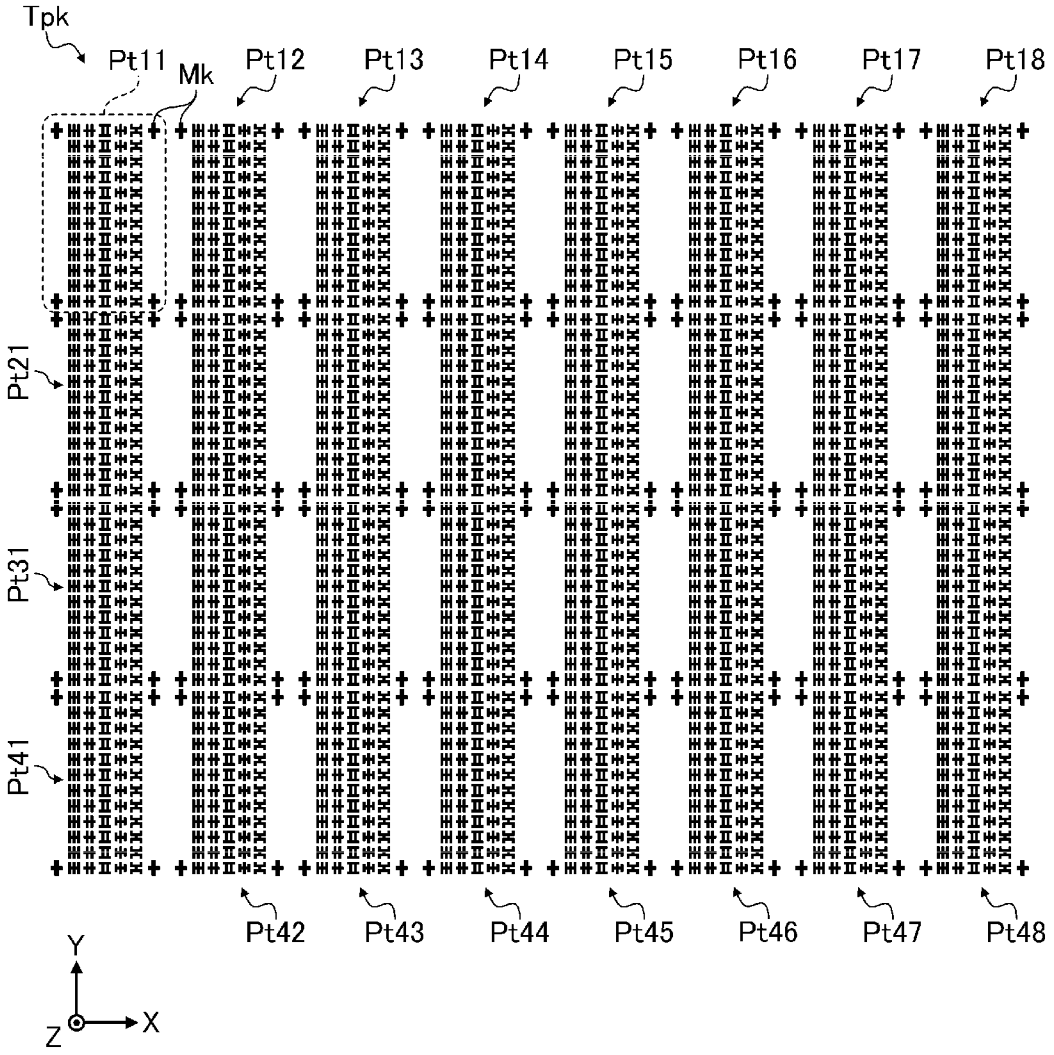
FIG. 9 is a view illustrating an example of a test pattern.

FIG. 9 illustrates a test pattern Tpk corresponding to the individual heads 134 in the first row of the head units **135*a* to 135*h* in the test pattern Tp. In the present embodiment, symbol k takes any one of a to h (k=a to h), and symbols a to h respectively correspond to the individual heads 134*a* to 134*h***. Accordingly, in the test pattern Tp, eight test patterns Tpk are arranged in the Y axis direction. That is, the test pattern Tp is constituted of test patterns Tpa to Tph (test pattern Tp=test patterns Tpa to Tph).

As illustrated in FIG. 9, the test pattern Tpk is formed of 32 patches Ptmn (patches Ptmn=Pt11 to Pt48) arranged in a matrix of 4 rows (m=4) and 8 columns (n=8). The patches Ptmn in four rows (m=4) sequentially correspond to the nozzle tips **133*a* to 133*d* of each individual head 134**.

Figure 10:
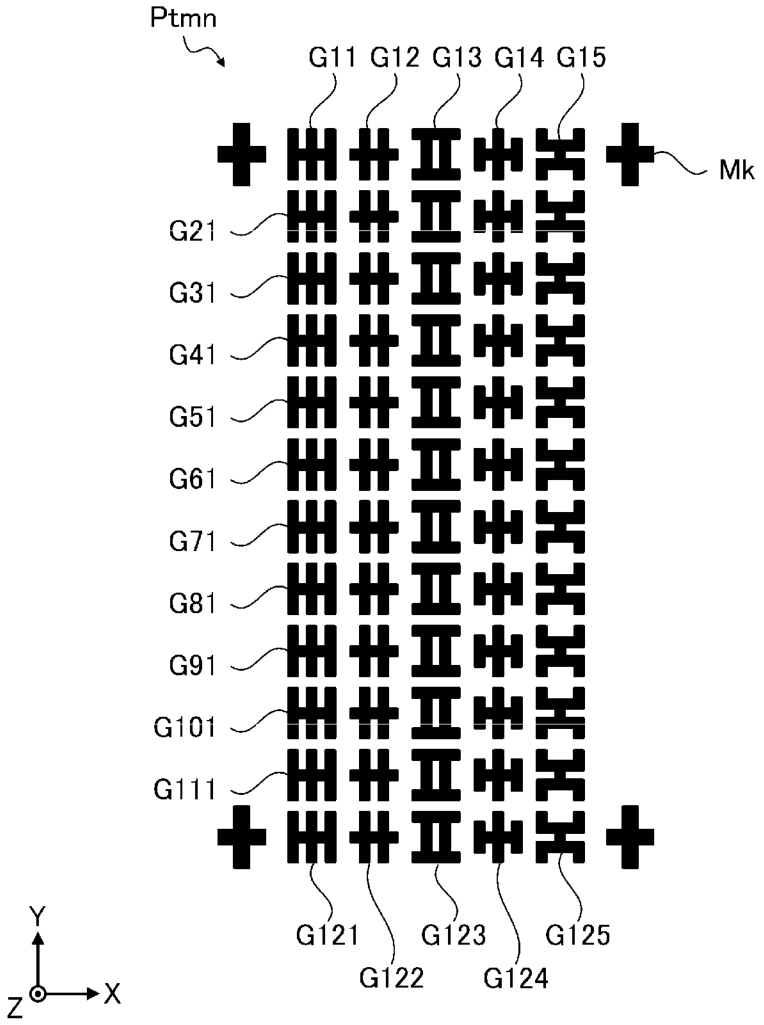
FIG. 10 is a view illustrating an example of an image of a patch included in the test pattern.

4 corners of the patch Ptmn are surrounded by patch recognition marks Mk, and as illustrated in FIG. 10, the patch Ptmn is constituted of 60 pattern images G11 to G125 (Gjk=G11 to G125) arranged in a matrix of 12 rows (j=12) and 5 columns (k=5)

The images Gjk are images that facilitate identification of the positions of the images Gjk by pattern matching using image recognition, and are images that are in line symmetry in a relative movement direction between the head 13 and the printing medium 5. In the present embodiment, the relative movement direction exists not only in the scanning direction, that is, in the X axis direction, but also in the transport direction, that is, in the Y axis direction. Accordingly, the images Gjk are images that are in point symmetry.

In the example illustrated in FIG. 10, the images Gjk are images having different shapes for respective columns, but the images Gjk may be images having the same shape.

A position of the image Gjk to be identified by pattern matching is a position of a representative point of each individual image Gjk and, for example, is a center point of the image Gjk. The position of the identified image Gjk can be treated as a representative value of landing position information of ink droplets ejected by one or a plurality of nozzles 131 used for printing the image Gjk.

For example, the pattern matching processing using image recognition is performed in such a manner that the test pattern Tp is captured as image data using a digital camera, a scanner, or the like, and a comparison is performed between a gradation value of original image data of the patch Ptmn that is teacher data and a gradation value of image data of each captured patch Ptmn. Accordingly, it is preferable that a size of each image Gjk be integer times as large the resolution of the digital camera or the scanner, and it is preferable that, with respect to a shape of each image Gjk, the relationship between a deviation amount and a difference in gradation value in the pattern matching processing be linear.

Next, the specification for printing the respective images Gjk is described with reference to FIG. 11 and FIG. 12.

Figure 11:
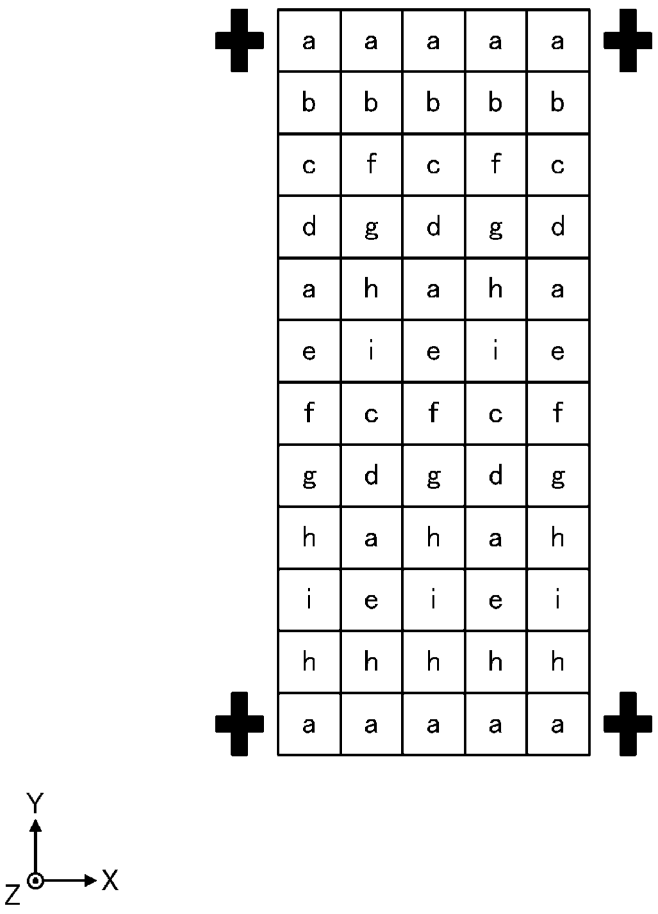
FIG. 11 is a map diagram illustrating printing specifications of respective images in the patch using corresponding ideograms.

FIG. 11 is a map diagram of printing specifications where the printing specifications of the respective images Gjk in the patch Ptmn are indicated by corresponding ideograms "a" to "i".

In the table shown in FIG. 12, symbols indicate the ideograms corresponding to the printing specifications each determined by the printing direction, the workpiece gap WG, and the nozzle row. The printing direction is the moving direction of the head 13 when the corresponding image Gjk is printed, and a direction of the forward path is expressed as +X direction and a direction of the backward path is expressed as −X direction. WG indicates whether the set value of the workpiece gap that is the distance from the distal end of the nozzle 131 to the printing medium 5 when the corresponding image Gjk is printed is WG1 or WG2. The nozzle row indicates whether the nozzle 131 from which an ink droplet is ejected is a nozzle belonging to the nozzle row 132A of the nozzle tip 133 or a nozzle belonging to the nozzle row 132B of the nozzle tip 133. The nozzle row of the symbol b is expressed as SA. This indicates that printing is performed by the nozzle 131 included in one piece of nozzle row 132A used as the reference among 256 pieces of nozzle rows 132A and 256 pieces of nozzle rows 132B that the head 13 has. In the following description, one piece of nozzle row 132A used as the reference is referred to as the reference nozzle row 132SA. The reference nozzle row 132SA is selected from the nozzle rows 132A disposed approximately near the center of the head 13 as viewed in plan view of the head 13.

In the map diagram of the printing specification illustrated in FIG. 11, even when the same symbol is used, printing with the symbol indicated at the different positions in the Y axis direction is performed by the different nozzle 131 in the Y-axis direction.

The head unit 135 prints the respective patches Ptmn as follows.

Printing of the patches Ptmn in the first column, that is, the patch Pt11, the patch Pt21, the patch Pt31 and the patch Pt41 is performed by the head unit 135*a* except for the image Gjk that is printed in accordance with the printing specification of the symbol b.

Printing of the patches Ptmn in the second column, that is, the patch Pt12, the patch Pt22, the patch Pt32 and the patch Pt42 is performed by the head unit 135*b* except for the image Gjk that is printed in accordance with the printing specification of the symbol b.

Printing of the patches Ptmn in the third column, that is, the patch Pt13, the patch Pt23, the patch Pt33 and the patch Pt43 is performed by the head unit 135*c* except for the image Gjk that is printed in accordance with the printing specification of the symbol b.

Printing of the patches Ptmn in the fourth column, that is, the patch Pt14, the patch Pt24, the patch Pt34 and the patch Pt44 is performed by the head unit 135*d* except for the image Gjk that is printed in accordance with the printing specification of the symbol b.

Printing of the patches Ptmn in the fifth column, that is, the patch Pt15, the patch Pt25, the patch Pt35 and the patch Pt45 is performed by the head unit 135*e* except for the image Gjk that is printed in accordance with the printing specification of the symbol b.

Printing of the patches Ptmn in the sixth column, that is, the patch Pt16, the patch Pt26, the patch Pt36 and the patch Pt46 is performed by the head unit 135*f* except for the image Gjk that is printed in accordance with the printing specification of the symbol b.

Printing of the patches Ptmn in the seventh column, that is, the patch Pt17, the patch Pt27, the patch Pt37 and the patch Pt47 is performed by the head unit 135*g* except for the image Gjk that is printed in accordance with the printing specification of the symbol b.

Printing of the patches Ptmn in the eighth column, that is, the patch Pt18, the patch Pt28, the patch Pt38 and the patch Pt48 is performed by the head unit 135*h* except for the image Gjk that is printed in accordance with the printing specification of the symbol b.

Next, the landing position deviation information obtained by analyzing the test pattern Tp described above is described with reference to FIG. 13 to FIG. 21.

First, the deviation amount of landing position deviation between the eight head units 135 that include the nozzles 131 for printing the images Gjk can be detected based on images Gjk=G11 to G15 that are formed of the symbol a surrounded by a bold line in FIG. 13, and the images Gjk=G21 to G25 that are formed of the symbol b surrounded by a bold line in FIG. 13. Specifically, the images Gjk=G21 to G25 formed of the symbol b are images that are printed by the nozzles 131 included in the reference nozzle row 132SA. Further, images Gjk=G11 to G15 formed of the symbol a disposed adjacent to the images on the +Y side are images printed with the same printing specification as the images Gjk=G21 to G25 formed of the symbol b, that is, in the same printing direction, with the same workpiece gap, and by the nozzle row on the same A side, and are printed by the nozzles 131 included in eight head units 135 respectively.

Accordingly, it is possible to detect the deviation amount of the landing position of the inks ejected by the nozzles 131 included in the eight head units 135 with respect to the landing position of the inks ejected by the nozzles 131 included in the reference nozzle row 132SA.

In the present embodiment, the reference nozzle row 132SA can be referred to as a first nozzle row, and the nozzle rows 132A included in 7 head units 135 respectively other than the head unit 135 having the reference nozzle row 132SA can be referred to as second nozzle rows. That is, the head 13 includes the first nozzle row and the second nozzle rows in which the nozzles 131 are arranged in the nozzle row direction. The plurality of patches Ptmn include the plurality of patches Ptmn from which a plurality of deviation amounts in the relative movement direction between the landing positions of ink droplets ejected from the nozzles 131 in the first nozzle row and the landing positions of ink droplets ejected from the nozzles 131 in the second nozzle rows are derivable.

Further, the head unit 135 having the reference nozzle row 132SA can be referred to as a first nozzle unit and other head units 135 can be referred to as a second nozzle unit. That is, the head 13 includes the first nozzle unit that is constituted of the plurality of nozzle rows in each of which the nozzles 131 are arranged, and the second nozzle units that differ from the first nozzle unit and are each constituted of the plurality of nozzle rows in each of which the nozzles 131 are arranged. The first nozzle row is included in the first nozzle unit and the second nozzle rows are included in the second nozzle unit.

The information relating to the deviation in landing position between the head units 135 can be obtained as the information of difference from the reference nozzle row 132SA. That is, 20 pieces of information (5 pieces of information/patch Ptmn×4 patches Ptmn) can be obtained for each individual head 134. That is, 160 pieces of information (20 pieces of information×8 pieces of individual heads 134) can be obtained for each individual head unit 135.

Based on 160 pieces of information of deviations of landing positions obtained as described above, correction values for suppressing the deviations of landing positions between 8 head units 135 are derivable. For example, as described above, the deviations of landing positions in the X axis direction can be suppressed by correcting the timing at which the ink droplets are ejected.

The correction values of the ejection timings are made to correspond to the individual values of 160 pieces of information of the deviations of landing positions obtained as described above, and can be derived as candidates for the correction values. That is, the test pattern Tp includes the plurality of patches Ptmn from which a plurality of candidates for correction values for correcting landing positions at which ink droplets land on the printing medium 5 in the relative movement direction.

As a method for deriving correction values that correct the timings at which ink drops are ejected for the respective head units 135, various types of statistical processing methods can be utilized.

For example, 160 pieces of information of deviations of landing positions obtained as described above are averaged, and the correction value is derived as a correction value for correcting an ejection timing corresponding to the obtained average value.

Alternatively, in a case where the information indicating a particular value is included in 160 pieces of information of deviations of landing positions obtained as described above, an average value is calculated after excluding the information indicating the particular value, and the correction value is derived as a correction value for correcting an ejection timing corresponding to the obtained average value. The particular value is a value that is not detected in normal printing, and is a value that is detected when abnormalities occur with respect to the positions of the patches Ptmn and the shapes of the patches Ptmn due to forming of wrinkles on the printing medium 5 or lifting of the printing medium 5, clogging of the nozzles 131 with ink, or the like.

Additionally, a method may be adopted where a median or a mode of 160 pieces of values of deviations of landing positions are extracted as a representative value, and a correction value corresponding to the representative value is used as the correction value for correcting an ejection timing.

Further, a method for correcting the ink droplet ejection timing for each nozzle tip 133 may be adopted in place of the method for correcting the ink droplet ejection timing for each head unit 135. In this case, based on 5 pieces of information of deviations of landing positions obtained from 5 sets of patches Ptmn of the same nozzle tip 133, an average value or a median of the information is adopted as a representative value of deviation amounts.

Here, in a case where the present embodiment is taken as a method for adjusting the printing apparatus 1 that includes the head 13 having the plurality of nozzles 131 capable of ejecting ink droplets onto the printing medium 5, and the movement unit 20 that moves the head 13 relative to the printing medium 5 in the relative movement direction, the adjustment method of the printing apparatus 1 includes a test pattern recording step of printing the test pattern Tp having the plurality of patches Ptmn from which a plurality of candidates for correction values for correcting landing positions at which ink droplets land on the printing medium 5 in a relative movement direction are obtained by controlling the head 13 and the moving unit 20, a correction value candidate deriving step of deriving the plurality of candidates for the correction value from the test pattern Tp, and a correction value determination step of determining correction values by statistically processing the plurality of derived candidates for the correction value.

As described above, the patches Ptmn are the patterns in line symmetry in the direction of relative movement that allows the detection of the printing positions at which the patches Ptmn are printed by pattern-matching, and the difference information of the printing positions of two patches Ptmn in the plurality of patches Ptmn is used for deriving the candidate for individual correction value among the candidates for the plurality of correction values.

In the test pattern recording step, as in the case of the images Gjk=G21 to G25 formed of the symbol b and the images Gjk=G11 to G15 formed of the symbol a, and also as described hereinafter, two patches Ptmn for obtaining the difference information are printed adjacently to each other in the relative movement direction along which the deviation of the landing position is detected, in other words, the direction that intersects with the X axis direction, that is, in the Y axis direction.

Figure 14:
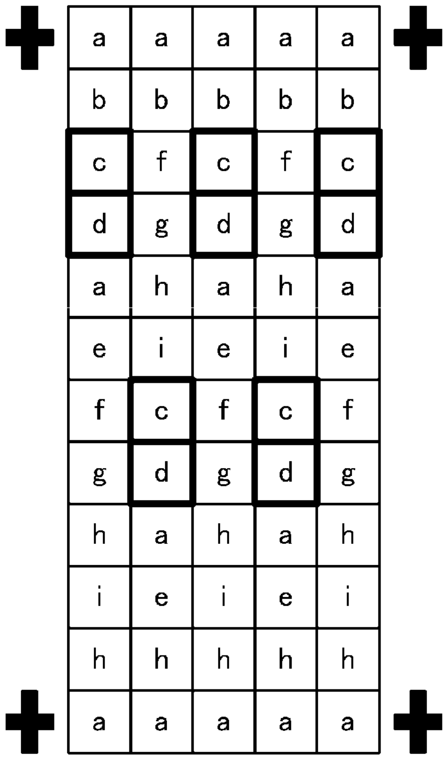
FIG. 14 is a map diagram of the printing specifications for explaining information of landing positions of ink droplets obtained from the test pattern.

Next, based on the images Gjk=G31, G33, G35, G72, G74 formed of the symbol c surrounded by a bold line in FIG. 14 and the images Gjk=G41, G43, G45, G82, G84 formed of the symbol d surrounded by a bold line in FIG. 14, estimate values of ejection velocities Vm0 of ink droplets from the nozzles 131 that print these images Gjk can be obtained for respective head units 135.

To describe specifically, the printing of the images Gjk=G31, G33, G35, G72, G74 formed of the symbol c and the printing of the images Gjk=G41, G43, G45, G82, G84 disposed adjacently to the images Gjk=G31, G33, G35, G72, G74 in the Y axis direction respectively and formed of the symbol d are different from each other only with respect to the workpiece gap WG. Both the printing direction in printing of the images Gjk=G31, G33, G35, G72, G74 and the printing direction in printing of the images Gjk=G41, G43, G45, G82, G84 are the same −X direction, and the nozzle rows used for printing the images Gjk=G31, G33, G35, G72, G74 and the images Gjk=G41, G43, G45, G82, G84 are the nozzle rows 132A respectively.

As illustrated in FIG. 5, $\delta 2=(WG2-WG1)/Vm0\times Vcr$ is established.

Accordingly, $Vm0=(WG2-WG1)/\delta 2\times Vcr$ is established, and when the workpiece gaps WG1, WG2, and the moving speed Vcr of the head 13 are known values, the ejection velocity Vm0 of the ink droplet from the nozzle 131 can be obtained as the estimate value by detecting δ2 from the images Gjk=G31, G33, G35, G72, G74 formed of the symbol c and the images Gjk=G41, G43, G45, G82, G84 formed of the symbol d. For example, when the workpiece gap WG is changed or an irregularity is detected in the workpiece gap WG, as illustrated in FIG. 5, $\delta 2=\Delta WG/Vm0\times Vcr$ is established and hence, δ2 can be derived based on the obtained ejection velocity Vm0 of the ink droplet and, further, the correction values for correcting the ink droplet ejection timing corresponding to δ2 and the like can be derived.

160 pieces of δ2 can be obtained for respective head units 135 from the test pattern Tp. As a method for deriving the ejection velocities Vm0 of the ink droplets from the nozzles 131 based on 160 pieces of δ2, various types of statistical processing methods can be utilized in the same manner as the deriving of the correction values described above.

Figure 15:
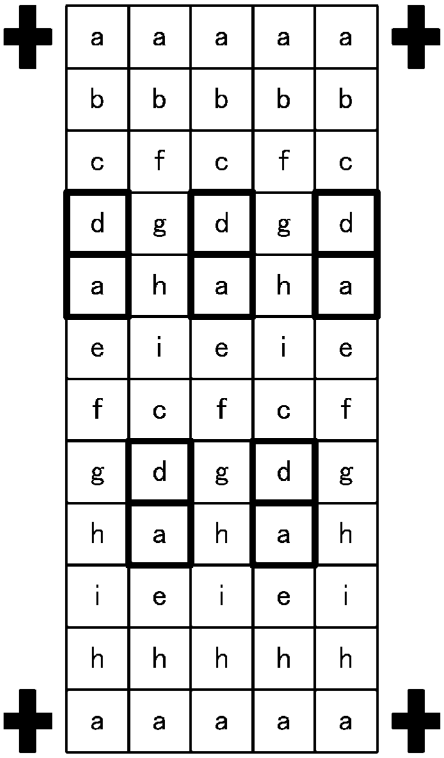
FIG. 15 is a map diagram of the printing specifications for explaining information of landing positions of ink droplets obtained from the test pattern.

Next, based on the images Gjk=G41, G43, G45, G82, G84 formed of the symbol d surrounded by a bold line in FIG. 15 and the images Gjk=G51, G53, G55, G92, G94 formed of the symbol a surrounded by a bold line in FIG. 15, the workpiece gaps WG that are distances from distal ends of the nozzles 131 that print these images Gjk to the printing medium 5 can be obtained as estimate values for the respective head units 135.

To describe specifically, the images Gjk=G41, G43, G45, G82, G84 formed of the symbol d and the images Gjk=G51, G53, G55, G92, G94 disposed adjacently to these images Gjk=G41, G43, G45, G82, G84 in the Y axis direction respectively and formed of the symbol a are different from each other only with respect to the printing direction.

On the premise that the ejection velocity Vm0 of the ink droplets and the moving speed Vcr of the head 13 are known values, and the moving speed Vcr of the head 13 in the forward path and the moving speed Vcr of the head 13 in the backward path are equal to each other, and the ejection direction of the ink droplets is not inclined with respect to the −Z direction, as illustrated in FIG. 8, $\delta 1\times 2=WG1/Vm0\times Vcr\times 2$ is established and hence, $WG1=(\delta 1\times 2)\times Vm0/Vcr/2$ is established and, as a result, the WG1 can be obtained by detecting δ1×2 from the images Gjk=G41, G43, G45, G82, G84 formed of the symbol d and the images Gjk=G51, G53, G55, G92, G94 formed of the symbol a. That is, the actual workpiece gap WG1 can be obtained with respect to the set workpiece gap WG. As a result, when an irregularity is detected in the workpiece gap WG, as illustrated in FIG. 5, the equation $\delta 2=\Delta WG/Vm0\times Vcr$ is established and hence, δ2 can be derived and, further, a correction value that corresponds to δ2 can be derived.

With respect to the value of $\delta 1\times 2$, 160 pieces of values can be obtained for each head unit 135 from the test pattern Tp. As a method for deriving the workpiece gap WG1 from 160 pieces of values of $\delta 1\times 2$, various types of statistical processing methods can be utilized in the same manner as the deriving of the correction values described above.

Here, as described above, the printing of the images Gjk=G41, G43, G45, G82, G84 formed of the symbol d and the printing of the images Gjk=G51, G53, G55, G92, G94 disposed adjacently to these images Gjk=G41, G43, G45, G82, G84 in the Y axis direction respectively and formed of the symbol a are different from each other only with respect to the printing direction. That is, the movement unit 20 moves the head 13 and the printing medium 5 relative to each other in the first direction that intersects with the nozzle row direction and the second direction that is the direction opposite to the first direction, and the plurality of patches Ptmn include the patches Ptmn that are printed by the head 13 moving in the first direction with respect to the printing medium 5, and the patches Ptmn that are printed by the head 13 moving in the second direction with respect to the printing medium 5.

Figure 16:
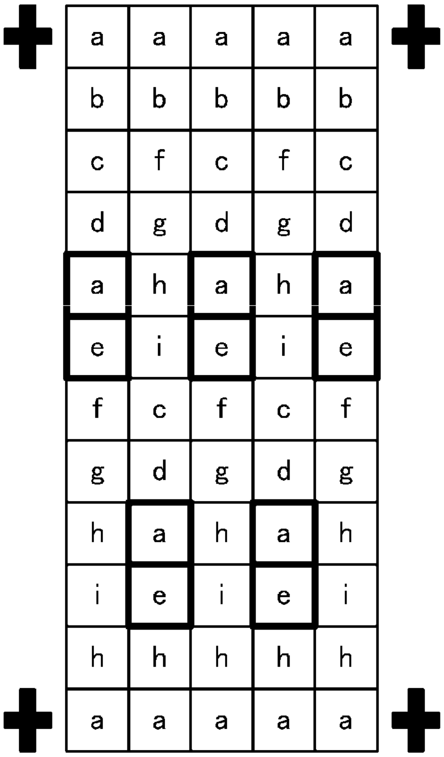
FIG. 16 is a map diagram of the printing specifications for explaining information of landing positions of ink droplets obtained from the test pattern.

Next, from the images Gjk=G51, G53, G55, G92, G94 formed of the symbol a surrounded by a bold line in FIG. 16 and the images Gjk=G61, G63, G65, G102, G104 formed of the symbol e surrounded by a bold line in FIG. 16, estimate values of the ejection velocities Vm0 of the ink droplets from the nozzles 131 that print these images Gjk can be obtained for the respective head units 135.

The contents described with reference to FIG. 16 differ from the contents described with reference to FIG. 14 only with respect to the positions of the nozzles 131 that print the image Gjk and the combination of the printing direction and two types of workpiece gaps WG. However, according to the contents described with reference to FIG. 16, information of the ejection velocities Vm0 of the ink droplets derived under different conditions can be obtained in the same nozzle row 132A and hence, the more effective correction values can be derived.

Figure 17:
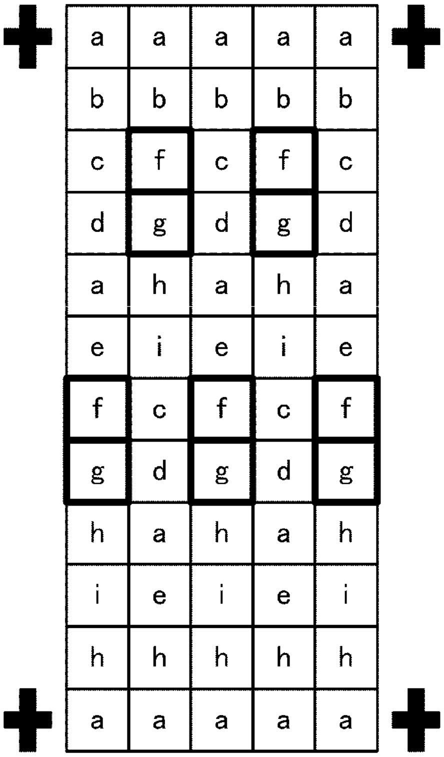
FIG. 17 is a map diagram of the printing specifications for explaining information of landing positions of ink droplets obtained from the test pattern.

Next, from the images Gjk=G32, G34, G71, G73, G75 formed of the symbol f surrounded by a bold line in FIG. 17 and the images Gjk=G42, G44, G81, G83, G85 formed of the symbol g surrounded by a bold line in FIG. 17, estimate values of the ejection velocities Vm0 of the ink droplets from the nozzles 131 that print these images Gjk can be obtained for the respective head units 135.

The contents described with reference to FIG. 17 differ from the contents described with reference to FIG. 14 only with respect to a point that the nozzle row that includes the nozzles 131 for printing the images Gjk is changed from the nozzle row 132A to the nozzle row 132B. However, according to the contents described with reference to FIG. 17, information of the ejection velocities Vm0 of ink droplets ejected by the nozzles 131 of different nozzle row can be obtained and hence, more effective correction values can be derived.

In the present embodiment, in a case where the images Gjk=G31, G33, G35, G72, G74 formed of the symbol c illustrated in FIG. 14 and the images Gjk=G41, G43, G45, G82, G84 formed of the symbol d illustrated in FIG. 14 are printed by the nozzles 131 included in the same nozzle row 132A, the nozzles 131 may be referred to as first nozzles, and the nozzle row 132A may be referred to as a first nozzle row.

Further, in a case where the images Gjk=G32, G34, G71, G73, G75 formed of the symbol f illustrated in FIG. 17 and the images Gjk=G42, G44, G81, G83, G85 formed of the symbol g illustrated in FIG. 17 are printed by the nozzles 131 included in the same nozzle row 132B, the nozzles 131 may be referred to as second nozzles, and the nozzle row 132B may be referred to as a second nozzle row.

That is, the plurality of patches Ptmn include a plurality of patches Ptmn from which a plurality of estimate values including a plurality of estimate values of the an ejection velocity of ink droplets ejected from a first nozzle in the first nozzle row and a plurality of estimate values of the an ejection velocity of ink droplets ejected from a second nozzle in the second nozzle row are derivable.

Also in the present embodiment, in a case where the images Gjk=G31, G33, G35 formed of the symbol c illustrated in FIG. 14 are printed by the nozzles 131 included in the same nozzle row 132A, the nozzles 131 may be referred to as first nozzles, and in a case where the images Gjk=G72, G74 formed of the symbol c illustrated in FIG. 14 are printed by the nozzles 131 that are included in the same nozzle row 132A including the first nozzles and are different from the first nozzles, the nozzles 131 may be referred to as third nozzles.

Further, in a case where the images Gjk=G32, G34 formed of the symbol f illustrated in FIG. 17 are printed by the nozzles 131 included in the same nozzle row 132B, the nozzles 131 may be referred to as second nozzles, and in a case where the images Gjk=G71, G73, G75 formed of the symbol f illustrated in FIG. 17 are printed by the nozzles 131 that are included in the same nozzle row 132B including the second nozzles and are different from the second nozzles, the nozzles 131 may be referred to as fourth nozzles.

That is, the plurality of patches Ptmn include a plurality of patches Ptmn from which a plurality of estimate values including a plurality of estimate values of the an ejection velocity of ink droplets ejected from a third nozzle in the first nozzle row and a plurality of estimate values of the an ejection velocity of ink droplets ejected from a fourth nozzle in the second nozzle row are derivable.

Figure 18:
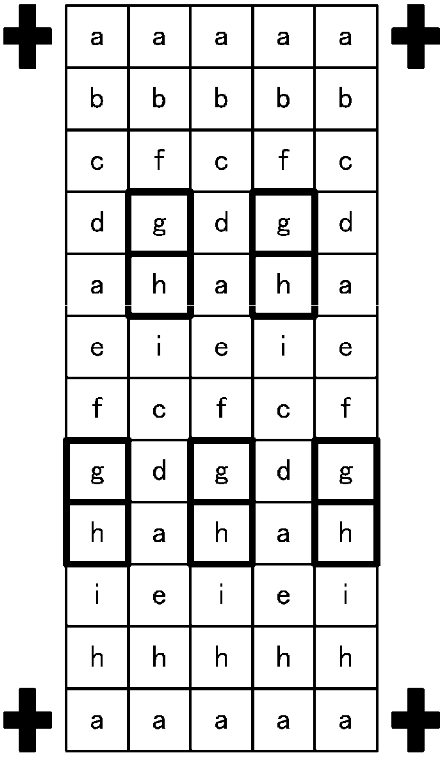
FIG. 18 is a map diagram of the printing specifications for explaining information of landing positions of ink droplets obtained from the test pattern.

Next, from the images Gjk=G42, G44, G81, G83, G85 formed of the symbol g surrounded by a bold line in FIG. 18 and the images Gjk=G52, G54, G91, G93, G95 formed of the symbol h surrounded by a bold line in FIG. 18, the workpiece gaps WG that are distances from distal ends of the nozzles 131 that print these images Gjk to the printing medium 5 can be obtained as estimate values for the respective head units 135.

The contents described with reference to FIG. 18 differ from the contents described with reference to FIG. 15 with respect to a point that the nozzle row that includes the nozzles 131 for printing the images Gjk is changed from the nozzle row 132A to the nozzle row 132B. However, according to the contents described with reference to FIG. 18, the estimate values of the workpiece gaps WG that are distances from distal ends of the nozzles 131 in the different nozzle row to the printing medium 5 can be obtained and hence, the more effective correction values can be derived.

Here, in a case where the images Gjk=G41, G43, G45, G82, G84 formed of the symbol d illustrated in FIG. 15 and the images Gjk=G51, G53, G55, G92, G94 formed of the symbol a illustrated in FIG. 15 are printed by the nozzles 131 included in the same nozzle row 132A, the nozzles 131 may be referred to as first nozzles, and the nozzle row 132A may be referred to as a first nozzle row.

Further, in a case where the images Gjk=G42, G44, G81, G83, G85 formed of the symbol g illustrated in FIG. 18 and the images Gjk=G52, G54, G91, G93, G95 formed of the symbol h illustrated in FIG. 18 are printed by the nozzles 131 included in the same nozzle row 132B, the nozzles 131 may be referred to as second nozzles, and the nozzle row 132B may be referred to as a second nozzle row.

That is, the plurality of patches Ptmn include a plurality of patches Ptmn from which a plurality of estimate values including a plurality of estimate values of a distance from the first nozzle in the first nozzle row to the printing medium 5 and a plurality of estimate values of a distance from the second nozzle in the second nozzle row to the printing medium 5 are derivable.

Here, in the present embodiment, in a case where the images Gjk=G41, G43, G45 formed of the symbol d illustrated in FIG. 15 are printed by the nozzles 131 included in the same nozzle row 132A, the nozzles 131 may be referred to as first nozzles, and in a case where the images Gjk=G82, G84 formed of the symbol d illustrated in FIG. 15 are printed by the nozzles 131 that are included in the same nozzle row 132A including the first nozzles and are different from the first nozzles, the nozzles 131 may be referred to as third nozzles.

Further, in a case where the images Gjk=G42, G44 formed of the symbol g illustrated in FIG. 18 are printed by the nozzles 131 included in the same nozzle row 132B, the nozzles 131 may be referred to as second nozzles, and in a case where the images Gjk=G81, G83, G85 formed of the symbol g illustrated in FIG. 18 are printed by the nozzles 131 that are included in the same nozzle row including the second nozzles and are different from the second nozzles, the nozzles 131 may be referred to as fourth nozzles.

That is, the plurality of patches Ptmn include a plurality of patches Ptmn from which a plurality of estimate values including a plurality of estimate values of a distance from the third nozzle in the first nozzle row to the printing medium 5 and a plurality of estimate values of a distance from the fourth nozzle in the second nozzle row to the printing medium 5 are derivable.

Figure 19:
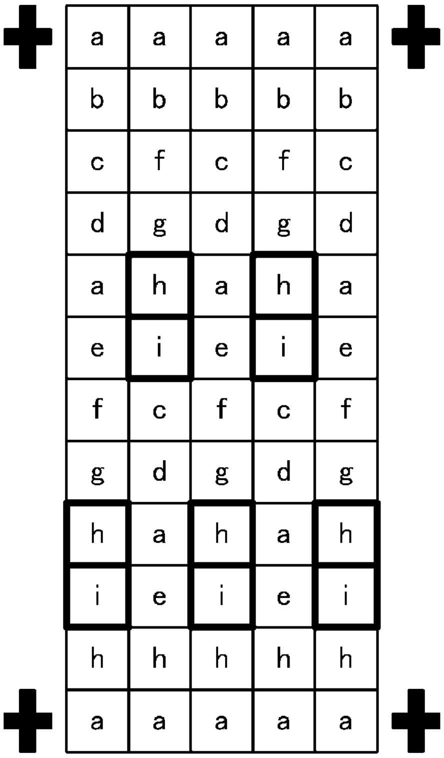
FIG. 19 is a map diagram of the printing specifications for explaining information of landing positions of ink droplets obtained from the test pattern.

Next, from the images Gjk=G52, G54, G91, G93, G95 formed of the symbol h surrounded by a bold line in FIG. 19 and the images Gjk=G62, G64, G101, G103, G105 formed of the symbol i surrounded by a bold line in FIG. 19, estimate values of the ejection velocities Vm0 of the ink droplets from the nozzles 131 that print these images Gjk can be obtained for the respective head units 135.

The contents described with reference to FIG. 19 differ from the contents described with reference to FIG. 16 only with respect to a point that the nozzle row that includes the nozzles 131 for printing the images Gjk is changed from the nozzle row 132A to the nozzle row 132B. However, according to the contents described with reference to FIG. 19, information of the ejection velocities Vm0 of ink droplets ejected by the nozzles 131 of different nozzle row can be obtained and hence, more effective correction values can be derived.

Figure 20:
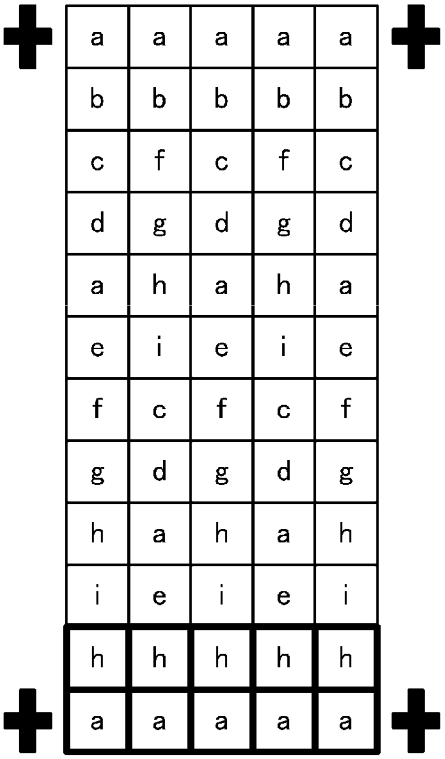
FIG. 20 is a map diagram of the printing specifications for explaining information of landing positions of ink droplets obtained from the test pattern.

Next, from the images Gjk=G111, G112, G113, G114, G115 formed of the symbol h surrounded by a bold line in FIG. 20 and the images Gjk=G121, G122, G123, G124, G125 formed of the symbol a surrounded by a bold line in FIG. 20, deviation amounts of deviations of the landing positions between the nozzle rows including the nozzles 131 that print these images Gjk can be detected for the respective head units 135.

To describe specifically, the images Gjk=G111, G112, G113, G114, G115 formed of the symbol h are images printed by the nozzles 131 included in the nozzle row 132B. Further, images Gjk=G121, G122, G123, G124, G125 disposed adjacently to these images on a −Y side and formed of the symbol a are images printed by the nozzles 131 included in the nozzle row 132A. Except for the above, these images are printed using the same printing specification. That is, these images are printed in the same printing direction and with the same workpiece gap.

Accordingly, the deviation amounts of the landing positions of inks ejected by the nozzles 131 included in the nozzle row 132B with respect to the landing positions of the inks ejected by the nozzles 131 included in the nozzle row 132A can be detected for the respective head units 135. Additionally, correction values such as ink droplet ejection timings corresponding to the obtained deviation amounts and the like can be derived.

That is, in the present embodiment, assuming the nozzle row 132A as the first nozzle row and the nozzle row 132B as the second nozzle row, the head 13 includes the first nozzle row and the second nozzle row in which the nozzles 131 are arranged in the nozzle row direction. The plurality of patches Ptmn include the plurality of patches Ptmn from which a plurality of deviation amounts in the relative movement direction between the landing positions of ink droplets ejected from the nozzles 131 in the first nozzle row and the landing positions of ink droplets ejected from the nozzles 131 in the second nozzle row are derivable.

Figure 21:
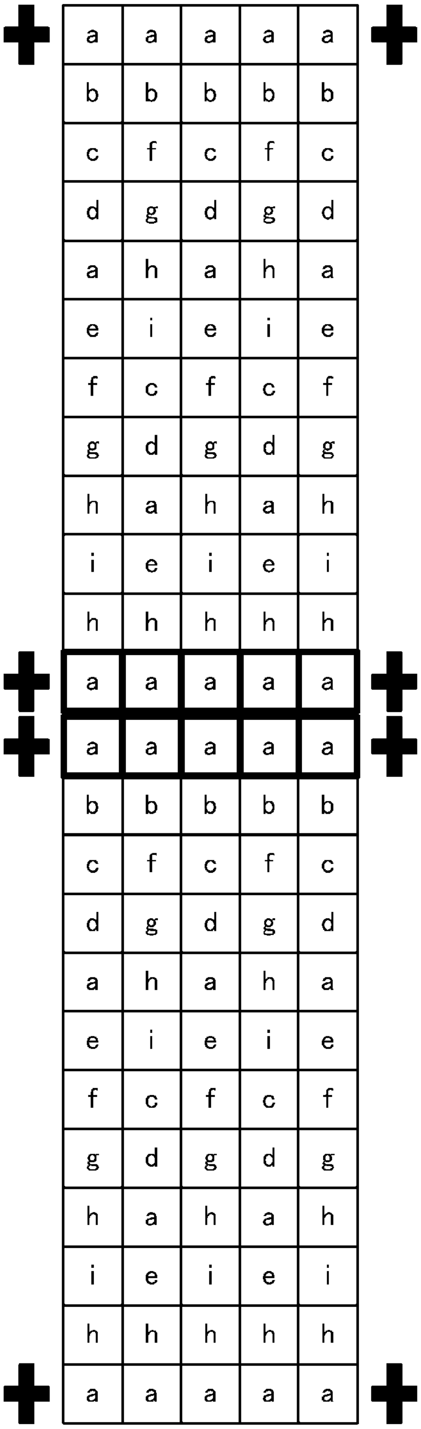
FIG. 21 is a map diagram of the printing specifications for explaining information of landing positions of ink droplets obtained from the test pattern.

Next, with respect to two patches Ptmn arranged vertically in FIG. 21, from the images Gjk=G121 to G125 formed of the symbol a surrounded by a bold line in the upper patch Ptmn and the images Gjk=G11 to G15 formed of the symbol a surrounded by a bold line in the lower patch Ptmn, the deviation amounts of the landing positions between the nozzle rows including the nozzles 131 for printing these images Gjk can be detected for the respective head units 135.

To describe more specifically, for example, in a case where the images Gjk=G121 to G125 formed of the symbol a surrounded by a bold line in the upper patch Ptmn are printed by the nozzles 131 belonging to the nozzle tip 133*a* and the images Gjk=G11 to G15 formed of the symbol a surrounded by a bold line in the lower patch Ptmn are printed by the nozzles 131 belonging to the nozzle tip 133*b*, the deviation amount of the deviation in landing position between the nozzle tip 133*a* and the nozzle tip 133*b* can be detected for the respective head units 135.

That is, in the present embodiment, assuming the nozzle row included in the nozzle tip 133*a* as the first nozzle row and the nozzle row included in the nozzle tip 133*b* as the second nozzle row, the head 13 includes the first nozzle row and the second nozzle row in which the nozzles 131 are arranged in a nozzle row direction. The plurality of patches Ptmn include a plurality of patches Ptmn from which a plurality of deviation amounts in a relative movement direction between landing positions of ink droplets ejected from the nozzles 131 in the first nozzle row and landing positions of ink droplets ejected from the nozzles 131 in the second nozzle row are derivable.

According to the present embodiment, the following advantageous effects can be obtained.

The printing apparatus 1 includes the head 13 having the plurality of nozzles 131 for ejecting ink droplets onto the printing medium 5, the movement unit 20 that moves the head 13 relative to the printing medium 5 in the relative movement direction, and the control unit 60 configured to perform printing by printing the test pattern Tp on the printing medium 5 by controlling the head 13 and the movement unit 20, and by correcting the control of the head 13 and/or the movement unit 20 based on the correction values obtained from the test pattern Tp. The test pattern Tp includes the plurality of patches Ptmn from which a plurality of candidates for correction values for correcting landing positions at which ink droplets land on the printing medium 5 in the relative movement direction. With such a configuration, the plurality of candidates for the correction value for correcting the landing positions can be obtained and hence, an appropriate correction value can be derived by applying statistical processing to the obtained plurality of candidates for the correction value. For example, even when particular data with deviation is included in the obtained plurality of candidates for the correction value, for example, by performing statistical processing such as elimination of the particular data, it is possible to derive the correction value based on the appropriate candidates for the correction value having no deviation. Accordingly, it is possible to perform printing to which the appropriate correction of the landing position is applied.

The head 13 includes the first nozzle row and the second nozzle row in which the nozzles 131 are arranged in the nozzle row direction. As has been described with reference to FIG. 20, the plurality of patches Ptmn include the plurality of patches Ptmn from which a plurality of deviation amounts in the relative movement direction between the landing positions of the ink droplets ejected from the nozzles 131 in the first nozzle row and the landing positions of the ink droplets ejected from the nozzles 131 in the second nozzle row are derivable.

By comparing ideal deviation amounts between the landing positions of the ink droplets ejected from the nozzles 131 in the first nozzle row and the landing positions of the ink droplets ejected from the nozzles 131 in the second nozzle row with these deviation amounts obtained from the test pattern Tp, it is possible to perform correction for performing printing with the ideal deviation amounts. For example, when the ideal deviation amounts are 0, the appropriate correction can be performed by correcting the control of the head 13 and/or the moving unit 20 such that the deviation amounts obtained from the test pattern Tp become 0.

In the present embodiment, data on the plurality of deviation amounts can be obtained from the test patter Tp. Therefore, even when particular data with deviation is included in the obtained data on the plurality of deviation amounts, for example, by performing statistical processing such as an elimination of the particular data, it is possible to derive the correction value based on data on the plurality of appropriate deviation amounts having no deviation. Accordingly, it is possible to perform printing to which the appropriate correction of the landing position is applied.

As has been described with reference to FIG. 14 and FIG. 17, the plurality of patches Ptmn include the plurality of patches Ptmn from which the estimate values including the plurality of estimate values of the ejection velocity Vm0 of the ink droplets ejected from a first nozzle in the first nozzle row and the plurality of estimate values of the ejection velocity Vm0 of the ink droplets ejected from a second nozzle in the second nozzle row are derivable.

By obtaining the ejection velocities Vm0 of the ejected ink droplets in advance, when setting of a relative moving speed between the head 13 and the printing medium 5 or the distance from the head 13 to the printing medium 5 is changed, the landing positions to be changed can be estimated and hence, the correction of the corresponding landing positions can be appropriately performed. In the present embodiment, the plurality of patches Ptmn provided for obtaining the candidates for the correction value for correcting the landing positions of the ink droplets include the plurality of patches Ptmn from which the estimate values including the plurality of estimate values of the ejection velocities Vm0 of the ink droplets ejected from a first nozzle in the first nozzle row and the plurality of estimate values of the ejection velocities Vm0 of the ink droplets ejected from a second nozzle in the second nozzle row are derivable. Accordingly, even when particular data with deviation is included in the plurality of obtained estimate values, for example, by performing statistical processing such as an elimination of the particular data, the estimate value of the ejection velocity Vm0 can be derived based on the estimate values of the plurality of appropriate ejection velocities Vm0 having no deviation. It is possible to derive the estimate value of the ejection velocity Vm0 of the ink droplets separately between the first nozzles in the first nozzle row and the second nozzles in the second nozzle row. As a result, the correction of the landing position based on the estimate value of the ejection velocity Vm0 of the ink droplets can be appropriately performed. For example, even in a case where setting of the relative moving speed between the head 13 and the printing medium 5 or the distance from the head 13 to the printing medium 5 is changed, an appropriate correction with respect to the landing positions to be changed can be performed.

As described above with reference to FIG. 14 and FIG. 17, the plurality of patches Ptmn includes the plurality of patches Ptmn from which the plurality of estimate values including the plurality of estimate values of the ejection velocities Vm0 of the ink droplets ejected from a first nozzle and the third nozzles in the first nozzle row and the plurality of estimate values of the ejection velocities Vm0 of the ink droplets ejected from a second nozzle and the fourth nozzles in the second nozzle row are derivable.

Even in the same nozzle row, there may be a case where the derived estimate values of the ejection velocities Vm0 differ depending on the nozzles 131. The estimate values of the ejection velocities Vm0 of the different nozzles 131 are appropriately derived in the first nozzle row and the second nozzle row respectively. Therefore, in a case where there exists an individual difference between the nozzles 131 in the same nozzle row, such an effect can be eliminated or reduced by obtaining an average of these estimate values, for example.

As described above with reference to FIG. 15 and FIG. 18, the plurality of patches Ptmn include the plurality of patches Ptmn from which the estimate values including the plurality of estimate values of the distances from the first nozzles in the first nozzle row to the printing medium 5, that is, the plurality of estimate values of the workpiece gaps WG and the plurality of estimate values of the distances from the second nozzles in the second nozzle row to the printing medium 5 are derivable.

In a case where the ink droplets are ejected while moving the head 13 relative to the printing medium 5, the distances from the nozzles 131 to the printing medium 5 are changed so that the landing positions of the ink droplets are changed. Accordingly, by obtaining the estimate values of the distances from the nozzles 131 to the printing medium 5 appropriately, the correction of the landing positions can be performed appropriately.

In the present embodiment, the plurality of patches Ptmn provided for obtaining the candidates for correction value for correcting the landing positions of the ink droplets include the plurality of patches Ptmn from which the estimate values including the plurality of estimate values of the distances from the first nozzles in the first nozzle row to the printing medium 5 and the plurality of estimate values of the distances from the second nozzles in the second nozzle row to the printing medium 5 are derivable. Accordingly, even when particular data with deviation is included in the plurality of obtained estimate values, for example, by performing statistical processing such as an elimination of the particular data, the appropriate estimate values of the distances from the nozzles 131 to the printing medium 5 can be derived based on the plurality of appropriate estimate values having no deviation. It is possible to derive the estimate values of the distances from the respective nozzles 131 to the printing medium 5 separately between the first nozzles in the first nozzle row and the second nozzles in the second nozzle row. As a result, the correction of the landing positions based on the estimate values of the distances from the nozzles 131 to the printing medium 5 can be appropriately performed. For example, even in a case where setting of the relative moving speed between the head 13 and the printing medium 5 or the distance from the head 13 to the printing medium 5 is changed, an appropriate correction can be performed with respect to the landing positions to be changed.

As described above with reference to FIG. 15 and FIG. 18, the plurality of patches Ptmn include the plurality of patches Ptmn from which the plurality of estimate values including the plurality of estimate values of the distances from the first nozzles and the third nozzles in the first nozzle row to the printing medium 5, that is, the plurality of estimate values of the workpiece gaps WG and the plurality of estimate values of the distances from the second nozzles and the fourth nozzles in the second nozzle row to the printing medium 5 are derivable.

Even in the same nozzle row, there may be a case where the estimate values derived as the distances from the nozzles 131 to the printing medium 5 differ depending on the nozzles 131. The estimate values of the distances from the different nozzles 131 to the printing medium 5 are appropriately derived in the first nozzle row and the second nozzle row respectively. Accordingly, even in a case where there exists the difference in estimate value in the same nozzle row, an effect of the differences can be eliminated or reduced by obtaining an average of these estimate values, for example.

As described with reference to FIG. 13, the head 13 includes the first nozzle unit that is constituted of the plurality of nozzle rows in each of which the nozzles 131 are arranged, that is, the head unit 135 having the reference nozzle row 132SA, and the second nozzle unit that differs from the first nozzle unit and is constituted of the plurality of nozzle rows in each of which the nozzles 131 are arranged, that is, the head unit 135 other than the first nozzle unit. The first nozzle row is included in the first nozzle unit, and the second nozzle row is included in the second nozzle unit. Accordingly, the correction of the deviation in landing position between the first nozzle unit and the second nozzle unit can be appropriately performed.

The movement unit 20 moves the head 13 and the printing medium 5 relative to each other in the first direction that intersects with the nozzle row direction and the second direction that is the direction opposite to the first direction, and the plurality of patches Ptmn include the patches Ptmn that are printed while the head 13 moves in the first direction with respect to the printing medium 5 and the patches Ptmn that are printed while the head 13 moves in the second direction with respect to the printing medium 5. Accordingly, printing to which an appropriate correction for the deviation in landing position that occurs during the relative movement of the head 13 with respect to the printing medium 5 in both the first and second directions is applied can be performed.

The method for adjusting the printing apparatus 1 includes the test pattern Tp recording step for printing the test pattern Tp having the plurality of patches Ptmn for obtaining the plurality of candidates for the correction value for correcting landing positions at which the ink droplets land on the printing medium 5 in the relative movement direction on the recording medium 5 by controlling the head 13 and the moving unit 20, the correction value candidate deriving step for deriving the plurality of candidates for the correction value from the test pattern Tp, and the correction value determining step for determining the correction value by statistically processing the plurality of derived candidates for the correction value.

An appropriate correction value can be obtained by statistically processing the plurality of derived candidates for the correction value. For example, even when a particular data with deviation is included in the plurality of obtained candidates for the correction value, for example, by performing statistical processing such as elimination of the particular data, it is possible to derive the correction value based on the appropriate candidates for the correction value having no deviation. Accordingly, it is possible to perform printing to which the appropriate correction of the landing position is applied.

The patches Ptmn are patterns in line symmetry in the relative movement direction that enable the detection of the printing positions at which the patches Ptmn are printed by pattern matching. In deriving each individual candidate for the correction value out of the plurality of candidates for the correction value, difference information of printing position between two patches Ptmn out of the plurality of patches Ptmn is used, and two patches Ptmn for obtaining the difference information are printed adjacently to each other in the direction that intersects with the relative movement direction.

In identifying the printing positions at which the patches Ptmn are printed by pattern matching based on image data picked up by a camera, it is preferable to eliminate an effect of aberration of a lens that the camera has.

According to the present embodiment, two patches Ptmn for detecting the difference information of printing position are printed adjacently to each other in the direction that intersects with the relative movement direction and hence, an effect of aberration of the lens can be reduced.

2. Second embodiment

Figure 22:
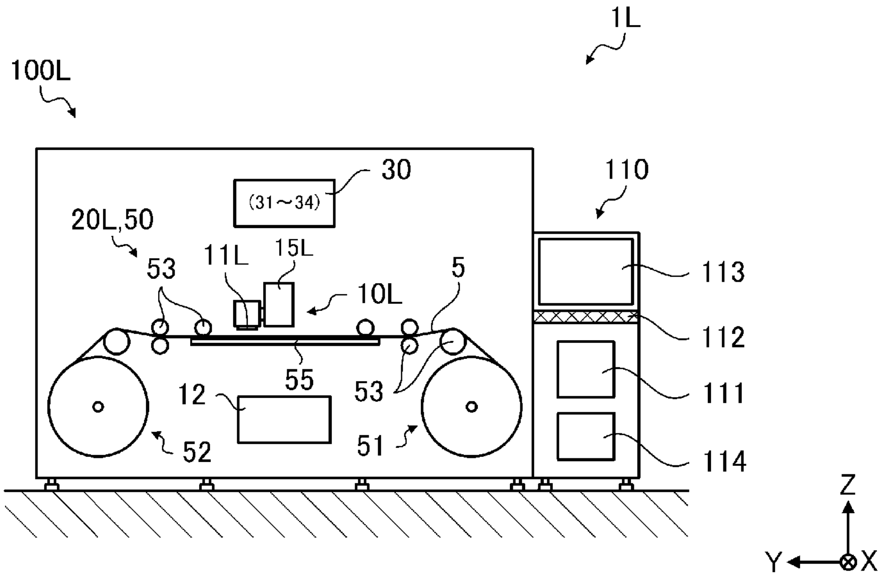
FIG. 22 is a front view illustrating a configuration of a printing apparatus that forms a liquid ejecting device according to a second embodiment.
Figure 23:
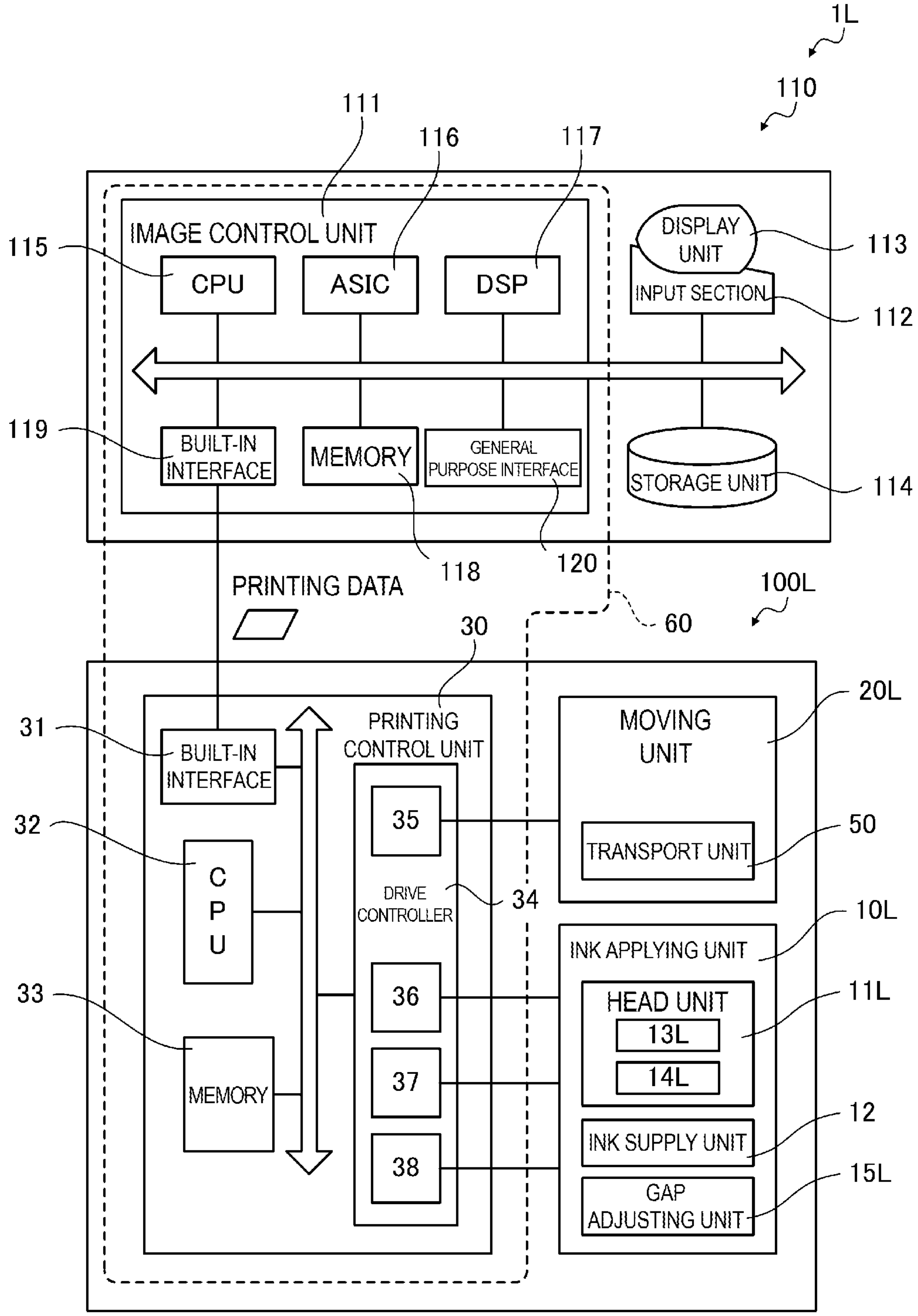
FIG. 23 is a block diagram illustrating the configuration of the printing apparatus that forms the liquid ejecting device according to the second embodiment.

Next, a printing apparatus 1L that forms a liquid ejecting device according to a second embodiment is described with reference to FIG. 22 to FIG. 24. Note that, the same constituents as those in the exemplary embodiment described above are given the same reference signs, and redundant description of these constituents will be omitted.

In the first embodiment, the description has been made with respect to the case where the printing unit 100 that the printing apparatus 1 includes is a serial printer. However, the printing unit 100 may be a line printer.

The printing apparatus 1L includes a printing unit 100L in place of the printing unit 100 in the first embodiment. The printing unit 100L is an ink-jet type line printer that prints a desired image on a printing medium 5 based on printing data received from an image processing unit 110.

The printing unit 100 includes an ink applying unit 10L, a movement unit 20L, a printing control unit 30 and the like. The printing unit 100L that has received printing data from the image processing unit 110 controls the ink applying unit 10L and the movement unit 20L by the printing control unit 30 based on the printing data, and prints an image on the printing medium 5.

The ink applying unit 10L includes a head unit 11L, an ink supply unit 12L, a gap adjusting unit 15L, and the like.

The movement unit 20L includes the transporting unit 50 and the like. The transporting unit 50 includes a supply portion 51, a storage portion 52, transport rollers 53, a platen 55, and the like.

The head unit 11L includes a head 13L and a head control unit 14L. The head unit 11L is fixedly supported such that a lower surface of the head 13L is disposed so as to face a printing area where a platen 55 supports the printing medium 5.

Figure 24:
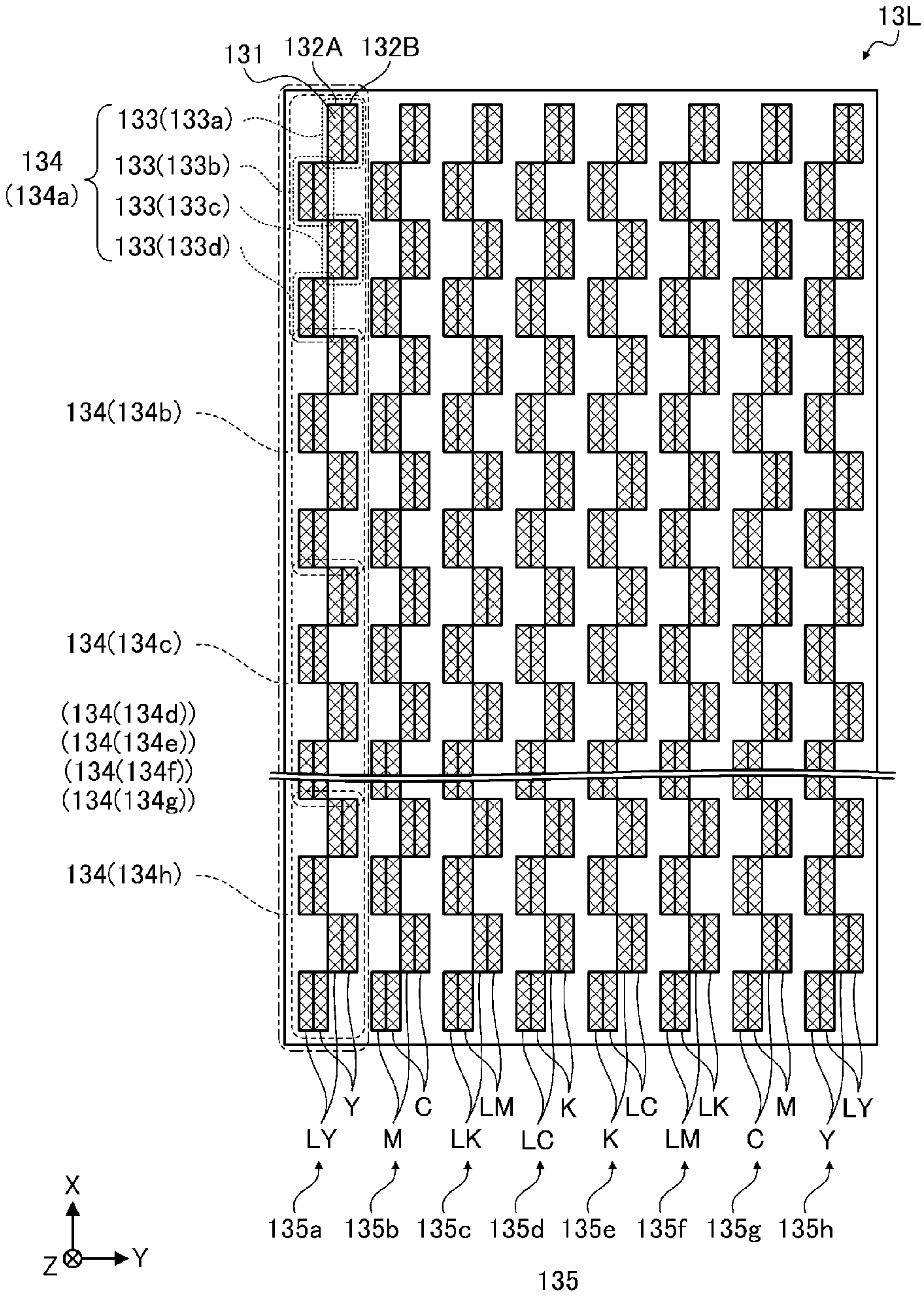
FIG. 24 is a schematic view illustrating an example of an arrangement of nozzle rows as viewed from a lower surface of a head included in the printing apparatus that forms the liquid ejecting device according to the second embodiment.

As illustrated in FIG. 24, the head 13L is configured such that the head 13 illustrated in FIG. 3 is rotated by 90° toward a left side as viewed from a lower surface of the head 13. For the sake of convenience of the description, the head 13L is illustrated such that the head 13L has the same configuration as the head 13 except for the direction that the head 13L is disposed. However, it is desirable that a length of a head unit 135, that is, the number of individual heads 134 that the head unit 135 includes be the number that makes the printing unit 100 correspond to a largest width of the printing medium 5 that is an object to be printed.

The gap adjustment unit 15L includes a support mechanism that is configured to change a support position of the head unit 11L or a support position of the platen 55 in the Z axis direction based on control of the printing control unit 30.

The printing control unit 30 prints a desired image on the printing medium 5 by repeating an operation of ejecting ink droplets to the printing medium 5 supplied to the printing area by the supply unit 51 and the transport rollers 53 from the head 13L, and an operation of moving the printing medium 5 in the Y axis direction by the transport rollers 53.

In the present embodiment, the relative movement direction is the transport direction, that is, the Y axis direction. Accordingly, the deviation of the landing position described with reference to FIG. 4 to FIG. 8 occurs in the Y axis direction.

Figure 25:
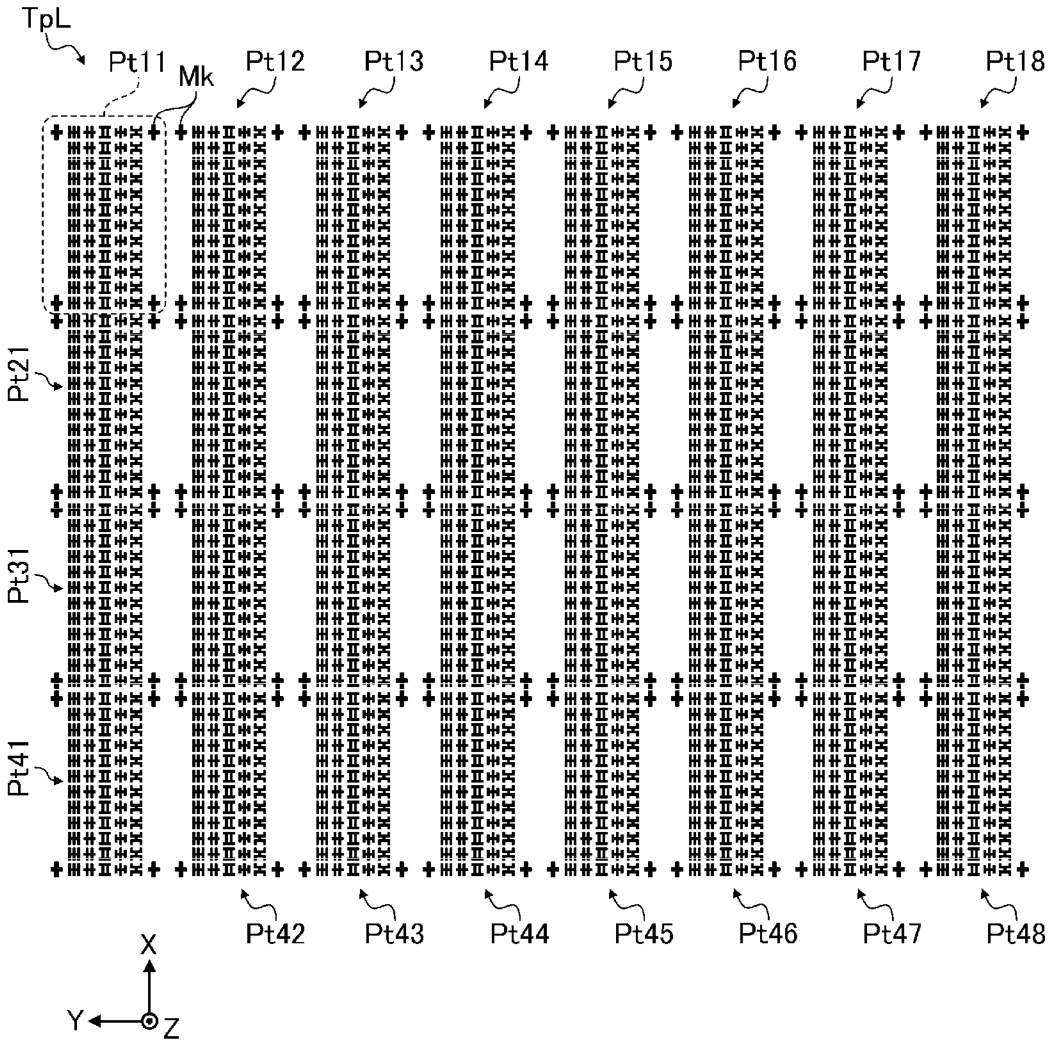
FIG. 25 is a view illustrating an example of a test pattern according to the second embodiment.

As a test pattern of the present embodiment, a test pattern TpL illustrated in FIG. 25 is used in place of the test pattern Tp of the first embodiment. It is sufficient for the test pattern TpL to have patches Ptmn from which information of deviations of landing positions of ink droplets in the Y axis direction can be detected. Accordingly, it is not always necessary to have images Gjk having the same shape as the first embodiment. It is sufficient that the images Gjk printed as the test pattern TpL be in line symmetry in the relative movement direction between the head 13L and the printing medium 5, that is, in the Y axis direction.

That is, in the printing apparatus 1L, the moving unit 20 moves the head 13L and the printing medium 5 relative to each other in the nozzle row direction, and the plurality of patches Ptmn include patches Ptmn to be printed before and after the head 13L moves relative to the printing medium 5 in the nozzle row direction.

Also in the liquid ejecting device of the present embodiment, a plurality of candidates for a correction value for correcting the deviations of the landing positions of ink droplets generated in the relative movement direction between the head 13L and the printing medium 5 can be obtained and hence, an appropriate correction value can be derived by statistically processing the plurality of obtained candidates for the correction value.

In the above-mentioned embodiments, the description has been described with respect to the case where one test pattern Tp is used and the case where one test pattern TpL is used. However, the respective embodiments may be configured such that a plurality of test patterns Tp or a plurality of test patterns TpL are printed, and appropriate correction values are derived based on a plurality of information of deviations of landing positions of ink droplets obtained from the plurality of test patterns Tp or the plurality of test patterns TpL.

In the above-mentioned embodiments, the description has been made with respect to the case where the printing unit 100 and the printing unit 100L are respectively formed of an inkjet printer where printing is applied to the elongated printing medium 5 supplied in a state where the printing medium 5 is wound in a roll shape. However, the printing medium is not limited to the roll-shaped printing medium 5, and a sheet-like single sheet paper may be also used as the printing medium. In a case where the sheet-like single sheet paper is used as the printing medium, the printing apparatus includes, in place of the supply unit 51, a supply mechanism that includes a separator for supplying the sheet paper one by one, for example, and, further, the printing apparatus includes, in place of the housing unit 52, for example, a housing tray that houses the sheet paper discharged after printing. In such a printing apparatus, when a test pattern having a plurality of patches Ptmn from which a plurality of candidates for a correction value for correcting deviations of landing positions of ink droplets can be obtained is adopted, such a test pattern may be printed over a plurality of sheet papers.

What is claimed is:

1. A liquid ejecting device comprising:

a head having a plurality of nozzles aligned along a nozzle row direction for ejecting droplets onto a recording medium;

a movement unit configured to move the head relative to the recording medium in a relative movement direction; and a control unit configured to record a test pattern on the recording medium by controlling the head and the movement unit, and to perform recording by correcting control of the head and/or the movement unit based on a correction value obtained from the test pattern, wherein the test pattern includes a plurality of patches, each of the patches including a plurality of images having different shapes other than ruled lines or dashed lines, each of the shapes having a length in the nozzle row direction and a length in a direction intersecting the nozzle row direction, the images being aligned along the direction intersecting the nozzle row direction, in each of the shapes of the images, the length in the nozzle row direction varies along the direction intersecting the nozzle row direction, and/or the length in the direction intersecting the nozzle row direction varies along the nozzle row direction, and the control unit is configured to derive a plurality of candidates for the correction value for correcting a landing position, at which the droplet lands on the recording medium, in the relative movement direction.

2. The liquid ejecting device according to claim 1, wherein each of the patches includes at least three of the images having mutually different shapes aligned along the direction intersecting the nozzle row direction.

3. The liquid ejecting device according to claim 1, wherein the head includes a first nozzle row and a second nozzle row in which the nozzles are arranged in the nozzle row direction, and the plurality of patches include a plurality of patches from which a plurality of deviation amounts, in the relative movement direction, between the landing positions of droplets ejected from the nozzles in the first nozzle row and the landing positions of droplets ejected from the nozzles in the second nozzle row are derivable.

4. The liquid ejecting device according to claim 3, wherein the plurality of patches include a plurality of patches from which a plurality of estimate values including a plurality of estimate values of an ejection velocity of droplets ejected from a first nozzle in the first nozzle row, and a plurality of estimate values of an ejection velocity of droplets ejected from a second nozzle in the second nozzle row are derivable.

5. The liquid ejecting device according to claim 4, wherein the plurality of patches include a plurality of patches from which a plurality of estimate values including a plurality of estimate values of an ejection velocity of droplets ejected from a third nozzle in the first nozzle row, and a plurality of estimate values of an ejection velocity of droplets ejected from a fourth nozzle in the second nozzle row are derivable.

6. The liquid ejecting device according to claim 3, wherein the plurality of patches include a plurality of patches from which a plurality of estimate values including a plurality of estimate values of a distance from a first nozzle in the first nozzle row to the recording medium, and a plurality of estimate values of a distance from a second nozzle in the second nozzle row to the recording medium are derivable.

7. The liquid ejecting device according to claim 6, wherein the plurality of patches include a plurality of patches from which a plurality of estimate values including a plurality of estimate values of a distance from a third nozzle in the first nozzle row to the recording medium, and a plurality of estimate values of a distance from a fourth nozzle in the second nozzle row to the recording medium are derivable.

8. The liquid ejecting device according to claim 3, wherein the head includes a first nozzle unit formed of a plurality of nozzle rows in which the nozzles are arranged, and a second nozzle unit different from the first nozzle unit and formed of a plurality of nozzle rows in which the nozzles are arranged, and the first nozzle row is included in the first nozzle unit, and the second nozzle row is included in the second nozzle unit.

9. The liquid ejecting device according to claim 3, wherein the movement unit is configured to move the head and the recording medium relative to each other in the relative movement direction toward a first direction that intersects with the nozzle row direction and a second direction that is a direction opposite to the first direction, and the plurality of patches include a patch that is recorded by the head moving in the first direction with respect to the recording medium, and a patch that is recorded by the head moving in the second direction with respect to the recording medium.

10. The liquid ejecting device according to claim 3, wherein the movement unit is configured to move the head and the recording medium relative to each other in the relative movement direction that is parallel to the nozzle row direction, and the plurality of patches include a patch that is recorded before and after the head moves relative to the recording medium in the nozzle row direction.

11. The liquid ejecting device according to claim 1, wherein each of the patches includes a region including a first image and a second image aligned in the direction intersecting the nozzle row direction, the first image being recorded by a first nozzle among the plurality of nozzles and the second image being recorded by a second nozzle among the plurality of nozzles.

12. The liquid ejecting device according to claim 11, wherein the images in each of the patches include a third image and a fourth image aligned in the nozzle row direction, the third image being recorded by a third nozzle among the plurality of nozzles and the fourth image being recorded by a fourth nozzle among the plurality of nozzles.

13. The liquid ejecting device according to claim 1, wherein the images in each of the patches aligned along the nozzle row direction have the same shape.

14. The liquid ejecting device according to claim 1, wherein the control unit is configured to complete recording of the test pattern on the recording medium without changing a position of the head relative to the recording medium in the nozzle row direction.

15. A method for adjusting a liquid ejecting device that includes a head having a plurality of nozzles aligned along a nozzle row direction for ejecting droplets onto a recording medium, and a movement unit configured to move the head relative to the recording medium in a relative movement direction, wherein the method comprising:

a test pattern recording step for recording, by controlling the head and the moving unit, a test pattern on the recording medium, the test pattern having a plurality of patches, each of the patches including a plurality of images having different shapes other than ruled lines or dashed lines, each of the shapes having a length in the nozzle row direction and a length in a direction intersecting the nozzle row direction, the images being aligned along the direction intersecting the nozzle row direction, and, in each of the shapes of the images, the length in the nozzle row direction varying along the direction intersecting the nozzle row direction, and/or the length in the direction intersecting the nozzle row direction varying along the nozzle row direction;

a correction value candidate deriving step for deriving a plurality of candidates for a correction value from the test pattern, the correction value being for correcting a landing position, at which the droplet lands on the recording medium, in the relative movement direction; and a correction value determining step for determining the correction value by statistically processing the plurality of derived candidates for the correction value.

16. The method for adjusting a liquid ejecting device according to claim 15, wherein the patches are the images in line symmetry in the relative movement direction that enable, by pattern matching, detection of recording positions at which the patches are recorded, difference information of recording positions of two patches among the plurality of patches is used for deriving each candidate for the correction value of the plurality of candidates for the correction value, and the two patches for obtaining the difference information are recorded adjacently to each other in a direction that intersects with the relative movement direction.

17. The method for adjusting a liquid ejecting device according to claim 15, wherein each of the patches includes a region including a first image and a second image aligned in the direction intersecting the nozzle row direction, the first image being recorded by a first nozzle among the plurality of nozzles and the second image being recorded by a second nozzle among the plurality of nozzles.

18. The method for adjusting a liquid ejecting device according to claim 17, wherein the images in each of the patches include a third image and a fourth image aligned in the nozzle row direction, the third image being recorded by a third nozzle among the plurality of nozzles and the fourth image being recorded by a fourth nozzle among the plurality of nozzles.

19. The method for adjusting a liquid ejecting device according to claim 15, wherein the images in each of the patches aligned along the nozzle row direction have the same shape.

20. The method for adjusting a liquid ejecting device according to claim 15, wherein the test pattern recording step is completed without changing a position of the head relative to the recording medium in the nozzle row direction.

* * * * *